United States Patent
Dorner et al.

(10) Patent No.: US 11,794,174 B2
(45) Date of Patent: Oct. 24, 2023

(54) TETRA-FUNCTIONAL CATALYST FOR THE OXIDATION OF NO, THE OXIDATION OF A HYDROCARBON, THE OXIDATION OF NH3 AND THE SELECTIVE CATALYTIC REDUCTION OF $NO_x$

(71) Applicant: BASF Corporation, Florham Park, NJ (US)

(72) Inventors: Robert Dorner, Hannover (DE); Martin Kalwei, Hannover (DE); Ansgar Wille, Hannover (DE); Kevin David Beard, Hannover (DE); Edgar Viktor Huennekes, Hannover (DE)

(73) Assignee: BASF Corporation, Florham Park, NJ (US)

( * ) Notice: Subject to any disclaimer, the term of this patent is extended or adjusted under 35 U.S.C. 154(b) by 83 days.

(21) Appl. No.: 16/462,048

(22) PCT Filed: Dec. 5, 2017

(86) PCT No.: PCT/EP2017/081538
§ 371 (c)(1),
(2) Date: May 17, 2019

(87) PCT Pub. No.: WO2018/104310
PCT Pub. Date: Jun. 14, 2018

(65) Prior Publication Data
US 2019/0314795 A1   Oct. 17, 2019

(30) Foreign Application Priority Data
Dec. 5, 2016 (EP) .................................... 16202264

(51) Int. Cl.
*B01J 29/76* (2006.01)
*B01J 23/42* (2006.01)
(Continued)

(52) U.S. Cl.
CPC ............ *B01J 29/763* (2013.01); *B01D 53/56* (2013.01); *B01D 53/58* (2013.01); *B01J 23/42* (2013.01);
(Continued)

(58) Field of Classification Search
CPC ...... B01D 2255/50; B01D 2255/20738; B01D 2255/20761; B01D 2255/1021;
(Continued)

(56) References Cited

U.S. PATENT DOCUMENTS 5,354,720 A   10/1994 Leyrer et al.
8,293,199 B2  10/2012 Beutel et al.
(Continued)

FOREIGN PATENT DOCUMENTS

CN          103118780 A       5/2013
DE     20 2007 019 652 U1    1/2015
(Continued)

OTHER PUBLICATIONS

U.S. Appl. No. 10/062,242, filed Jun. 14, 2018, US 2018-0304236 A1, Zhao, F., et al.
(Continued)

*Primary Examiner* — Jun Li
(74) *Attorney, Agent, or Firm* — DLA Piper LLP (US)

(57) ABSTRACT

The present invention relates to a catalyst, preferably for the selective catalytic reduction of NOx, for the oxidation of ammonia, for the oxidation of NO and for the oxidation of a hydrocarbon, the catalyst comprising a washcoat comprising one or more layers, the washcoat being disposed on a substrate, wherein the washcoat comprises a platinum group metal supported on a metal oxide support material, and one or more of an oxidic compound of V, an oxidic compound of W and a zeolitic material comprising one or more of Cu and Fe.

12 Claims, 11 Drawing Sheets

(51) Int. Cl.
  *B01D 53/56* (2006.01)
  *B01D 53/58* (2006.01)
  *F01N 3/20* (2006.01)
  *F01N 3/28* (2006.01)
  *B01J 35/00* (2006.01)
  *B01J 37/02* (2006.01)

(52) U.S. Cl.
  CPC ....... *B01J 35/0006* (2013.01); *B01J 37/0244* (2013.01); *F01N 3/2066* (2013.01); *F01N 3/2803* (2013.01); *B01D 2255/1021* (2013.01); *B01D 2255/1023* (2013.01); *B01D 2255/1025* (2013.01); *B01D 2255/20723* (2013.01); *B01D 2255/20738* (2013.01); *B01D 2255/20761* (2013.01); *B01D 2255/20776* (2013.01); *B01D 2255/50* (2013.01); *B01D 2255/9022* (2013.01); *B01D 2258/01* (2013.01); *F01N 2370/02* (2013.01)

(58) Field of Classification Search
  CPC .... B01D 2255/1023; B01D 2255/1025; B01D 53/56; B01D 53/58; B01J 23/42; B01J 29/763
  See application file for complete search history.

(56) References Cited

U.S. PATENT DOCUMENTS

| | | | |
|---|---|---|---|
| 8,637,426 B2* | 1/2014 | Hoke | F01N 3/103 502/333 |
| 8,715,618 B2 | 5/2014 | Trukhan et al. | |
| 8,883,119 B2 | 11/2014 | Bull et al. | |
| 8,961,914 B2 | 2/2015 | Mohanan et al. | |
| 9,242,238 B2 | 1/2016 | Mohanan et al. | |
| 9,272,272 B2 | 3/2016 | Trukhan et al. | |
| 2008/0127638 A1* | 6/2008 | Vaarkamp | F01N 3/2066 60/297 |
| 2008/0286184 A1 | 11/2008 | Ando et al. | |
| 2008/0292519 A1 | 11/2008 | Caudle et al. | |
| 2010/0166628 A1 | 7/2010 | Soeger et al. | |
| 2010/0236224 A1* | 9/2010 | Kumar | F01N 3/2073 60/297 |
| 2011/0064632 A1* | 3/2011 | Huang | F01N 3/106 422/171 |
| 2012/0107204 A1 | 5/2012 | Cox | |
| 2013/0078173 A1 | 3/2013 | Cox | |
| 2013/0149220 A1* | 6/2013 | Swallow | B01J 29/63 423/213.5 |
| 2014/0212350 A1 | 7/2014 | Andersen et al. | |
| 2015/0037233 A1* | 2/2015 | Fedeyko | B01J 37/0244 423/239.1 |
| 2015/0158023 A1* | 6/2015 | Rajaram | B01J 37/0248 423/213.5 |
| 2015/0252708 A1* | 9/2015 | Brown | F01N 3/085 60/299 |
| 2016/0090887 A1* | 3/2016 | Mitchell | F01N 3/208 60/274 |
| 2017/0152778 A1* | 6/2017 | Li | B01F 5/0614 |

FOREIGN PATENT DOCUMENTS

| | | |
|---|---|---|
| EP | 0 559 021 A2 | 9/1993 |
| EP | 1 992 409 A1 | 11/2008 |
| JP | 2008-279334 A | 11/2008 |
| JP | 2010-519039 A | 6/2010 |
| JP | 2013-542847 A | 11/2013 |
| KR | 20130103502 A | 9/2013 |
| WO | WO 2008/106523 A2 | 9/2008 |
| WO | WO 2012/037342 A1 | 3/2012 |
| WO | WO 2015/189680 A1 | 12/2015 |

OTHER PUBLICATIONS

International Search Report dated Feb. 19, 2018 in PCT/EP2017/081538, 6 pages.
International Preliminary Report on Patentability and Written Opinion dated Jun. 20, 2019 in PCT/EP2017/081538, 7 pages.

\* cited by examiner

TETRA-FUNCTIONAL CATALYST FOR THE OXIDATION OF NO, THE OXIDATION OF A HYDROCARBON, THE OXIDATION OF NH3 AND THE SELECTIVE CATALYTIC REDUCTION OF $NO_x$

The present invention relates to a tetra-functional catalyst for the oxidation of nitrogen monoxide (NO), the oxidation of a hydrocarbon (HC), the oxidation of ammonia ($NH_3$) and the selective catalytical reduction of nitrogen oxides ($NO_x$). Further, the present invention relates to a system for treating an exhaust gas, the system comprising the tetra-functional catalyst, wherein the tetra-functional catalyst is preferably located upstream of a catalyzed soot filter. In addition to that, the present invention relates to a process for preparing the tetra-functional catalyst.

In general, all heavy duty's exhaust gas treatment systems particularly in North America, Japan and the EU are equipped with a diesel particulate filter due to regulatory requirements. Thus, very cost-effective solutions have great economic potential due to the pressure on cost minimization. With the drive to reduce $CO_2$ emissions, engine out $NO_x$ levels are increasing to increase fuel economy, which creates a need for new technical solutions to maintain legal emission limits. Accordingly, many original equipment manufactures (OEMs) are looking at increasing engine-out $NO_x$ emissions being a side effect of OEMs trying to reduce their $CO_2$ emissions while increasing fuel economy due to impending regulations. These higher engine-out $NO_x$ emissions can be too much of a burden for a standard EU VI/EPA13 system. Thus, new layouts are needed to meet the new stringent regulations. A close coupled catalyst for selective catalytic reduction (SCR), which can aid the increased burden of $NO_x$ reduction, especially at high engine out $NO_x$ would be one of these possible new layouts.

However, for any new exhaust gas treatment system, the need for a closed diesel particulate filter would still be given. The collected soot in the filter must be converted via a suitable process into gaseous substances (usually $CO_2$), so that the filter does not get clogged. For this reason, diesel oxidation catalysts (DOC) are usually installed upstream of the filter containing relatively high amounts of expensive platinum group metals (PGM). The DOC can be used to catalytically burn diesel fuel. A temperature is hereby produced, at which the filter regeneration starts or is sped-up and made more efficient. However, during the intervals where no fuel is injected to generate a temperature over the catalyzed soot filter (CSF), $NO_2$ usually functions as oxidant for oxidizing the soot on the CSF. This alternative solution would be able to act as a fuel burn DOC as well as an up-stream SCR catalyst. Furthermore, this approach can be combined with the material's $DeNO_x$ activity by reacting the engine-out $NO_x$ with ammonia.

Thus, one major disadvantage of such an approach, where the DOC is replaced by an SCR catalyst, is the loss of $NO_2$-make upstream of a CSF for passive soot regeneration. Also, due to ammonia injection upstream of the PGM-rich CSF for $DeNO_x$, the selectivity towards $N_2O$ can increase.

WO 2015/189680 A1 relates to base metal catalysts, emission treatment systems and methods. More specifically, embodiments of said application are directed to catalysts, systems and methods having a base metal catalyst positioned upstream from a particulate filter and a selective catalytic reduction (SCR) catalyst. In systems in which hydrocarbons (e.g. fuel) are periodically injected upstream of the base metal catalyst, the base metal catalyst generates an exotherm over a temperature range of 300° C. to 650° C. to regenerate the downstream particulate filter which has collected soot. In particular, the catalyst of said application is substantially free of platinum group metals. As outlined above, said document also relates to a system for treatment of a lean burn engine exhaust gas stream, wherein the system particularly comprises the base metal catalyst disposed on a carrier substrate and a particulate filter and a first SCR catalyst located downstream from the base metal catalyst. Further, the exhaust gas treatment system may further comprise a platinum group metal (PGM) oxidation catalyst downstream from the base metal catalyst and upstream from the particulate filter.

Especially in view of the disadvantages as outlined above with respect to an approach based on conventionally used components such as catalysts and filters, it was an object of the present invention to establish a novel concept approaching the mitigation of needing a DOC in an exhaust gas treatment system as conventionally used. More specifically, it was an object of the present invention to provide a novel catalyst which is able to perform in a multi-functional way, in particular with respect to the four functions of NO oxidation, hydrocarbon oxidation, $NH_3$ oxidation and selective catalytic reduction of $NO_x$ ($DeNO_x$). In particular by oxidation of a hydrocarbon, a favorable temperature (i.e. an exotherm) is generated that may heat a catalyzed soot filter located downstream of the catalyst. Furthermore, the present invention aims at the design of novel after-treatment systems. In particular, it was an object of the present invention to provide an exhaust gas treatment system comprising the multi-functional catalyst, preferably as tetra-functional catalyst. More specifically, it was an object of the present invention with regard to the exhaust gas treatment system to render the use of a diesel oxidation catalyst (DOC), in particular upstream of a catalyzed soot filter (CSF), redundant.

Thus, it has surprisingly been found that a catalyst comprising a washcoat comprising one or more layers, wherein the washcoat is disposed on a substrate, and wherein the washcoat comprises (i) a platinum group metal supported on a metal oxide support material, and (ii) one or more of an oxidic compound of V, an oxidic compound of W and a zeolitic material comprising one or more of Cu and Fe, can function in the selective catalytic reduction of NOR, in the oxidation of ammonia, in the oxidation of NO and in the oxidation of a hydrocarbon.

In particular, it has been surprisingly found out that the inventive catalyst is able to minimize both $NH_3$ slip as well as HC slip and concurrently can produce $NO_2$ for the passive regeneration of a CSF as well as reduce $NO_x$ when a reductant is present. Further, it has surprisingly been found that the inventive catalyst can reduce $NO_x$ as well as possibly produce a favorable temperature (i.e. an exotherm) for the CSF regeneration, especially when fuel is dosed (in engine cylinder or in exhaust pipe) and is burned on the catalyst. Alternatively, the exotherm can be solely produced over the platinum group metal supported on a metal oxide support material, in particular if no other material is upstream of the inventive catalyst that is capable of oxidizing HC. The inventive catalyst can also act as a $DeNO_x$ catalyst when a suitable dosing of a reductant is applied (e.g. ammonia or an alternative substance that liberates ammonia) in the exhaust gas prior to reaching the catalyst. In other words, the inventive catalyst can oxidize $NH_3$ to limit ammonia slip (e.g. onto a CSF located downstream) which concurrently acts as an NO oxidation catalyst for downstream soot regeneration on the filter.

The inventive catalyst may comprise a washcoat comprising one or more layers, wherein the washcoat is preferably uniformly disposed on the substrate. In view of an exhaust gas treatment system, the inventive catalyst can be placed after the non-PGM containing fuel burn catalyst, e.g. an upstream SCR catalyst, to oxidize possible $NH_3$ slip. This surprisingly results in the minimization of $N_2O$ make over the CSF and also in a good HC slip clean-up. Furthermore, the PGM contained in the inventive catalyst can also be utilized to oxidize NO to $NO_2$, aiding the passive regeneration over the CSF, when no $NH_3$ is present. When dosing at lower NSRs, the $NH_3$ slip onto the PGM-containing inventive catalyst would be negligible and one can thus employ the inventive catalyst to generate $NO_2$ for passive regeneration on the CSF.

Therefore, the present invention relates to a catalyst comprising a washcoat comprising one or more layers, the washcoat being disposed on a substrate, wherein the washcoat comprises
(i) a platinum group metal supported on a metal oxide support material, and
(ii) one or more of an oxidic compound of V, an oxidic compound of W, and a zeolitic material comprising one or more of Cu and Fe.

Thus, it is preferred that the catalyst is used for one or more of the selective catalytic reduction of $NO_x$, the oxidation of ammonia, the oxidation of NO and the oxidation of a hydrocarbon.

As regards the washcoat, there are particular restrictions with respect to the number of layers the washcoat comprises. It is preferred that the washcoat comprises one layer, two layers or three layers.

As regards the platinum group metal supported on a metal oxide, any suitable platinum group metal can be employed, provided that it can be supported on a metal oxide support material. Preferably, the platinum group metal supported on a metal oxide support material is one or more of Ru, Rh, Pd, Os, Ir and Pt. More preferably, the platinum group metal supported on a metal oxide support material is one or more of Rh, Pd and Pt, more preferably one or more of Pd and Pt, and more preferably Pt.

With respect to the metal oxide support material, any suitable metal oxide support material can be employed, provided that it can be used as a support for the platinum group metal. Preferably, the metal oxide support material is one or more of alumina, zirconia-alumina, silica-alumina, titania, zirconia-titania and ceria. More preferably, the metal oxide support material is one or more of alumina, silica-alumina and zirconia-alumina, more preferably zirconia-alumina.

Therefore, the present invention preferably relates to a catalyst comprising a washcoat comprising one or more layers, the washcoat being disposed on a substrate, wherein the washcoat comprises
(i) platinum supported on zirconia-alumina, and
(ii) one or more of an oxidic compound of V, an oxidic compound of W, and a zeolitic material comprising one or more of Cu and Fe.

Concerning the zeolitic material as such which may be contained in the inventive catalyst, no restrictions apply according to the present invention such that any conceivable zeolitic material may be contained therein. However, it is preferred that the washcoat of the inventive catalyst comprises a zeolitic material.

According to the present invention, it is particularly preferred that the framework of the zeolitic material comprises a tetravalent element. It is particularly preferred according to the present invention that the zeolitic material comprises a tetravalent element Y which is one or more of Si, Sn, Ti, Zr and Ge, preferably Si. Further, it is preferred that the framework structure of the zeolitic material comprises a trivalent element X. It is particularly preferred according to the present invention that the zeolitic material comprises one or more of B, Al, Ga and In, preferably Al.

Furthermore, as regards the framework structure of the zeolitic material that may be contained in the inventive catalyst, again no particular restrictions apply such that the zeolitic material may have any framework structure type. Generally, it is conceivable that the framework structure type of the zeolitic material is one of ABW, ACO, AEI, AEL, AEN, AET, AFG, AFI, AFN, AFO, AFR, AFS, AFT, AFV, AFX, AFY, AHT, ANA, APC, APD, AST, ASV, ATN, ATO, ATS, ATT, ATV, AVL, AWO, AWW, BCT, BEA, BEC, BIK, BOF, BOG, BOZ, BPH, BRE, BSV, CAN, CAS, CDO, CFI, CGF, CGS, CHA, -CHI, -CLO, CON, CSV, CZP, DAC, DDR, DFO, DFT, DOH, DON, EAB, EDI, EEI, EMT, EON, EPI, ERI, ESV, ETR, EUO, *-EWT, EZT, FAR, FAU, FER, FRA, GIS, GIU, GME, GON, GOO, HEU, IFO, IFR, -IFU, IFW, IFY, IHW, IMF, IRN, IRR, -IRY, ISV, ITE, ITG, ITH, *-ITN, ITR, ITT, -ITV, ITW, IWR, IWS, IWV, IWW, JBW, JNT, JOZ, JRY, JSN, JSR, JST, JSW, KFI, LAU, LEV, LIO, -LIT, LOS, LOV, LTA, LTF, LTJ, LTL, LTN, MAR, MAZ, MEI, MEL, MEP, MER, MFI, MFS, MON, MOR, MOZ, *MRE, MSE, MSO, MTF, MTN, MTT, MTW, MVY, MWF, MWW, NAB, NAT, NES, NON, NPO, NPT, NSI, OBW, OFF, OKO, OSI, OSO, OWE, -PAR, PAU, PCR, PHI, PON, POS, PSI, PUN, RHO, -RON, RRO, RSN, RTE, RTH, RUT, RWR, RWY, SAF, SAO, SAS, SAT, SAV, SBE, SBN, SBS, SBT, SEW, SFE, SFF, SFG, SFH, SFN, SFO, SFS, *SFV, SFW, SGT, SIV, SOD, SOF, SOS, SSF, *-SSO, SSY, STF, STI, *STO, STT, STW, -SVR, SW, SZR, TER, THO, TOL, TON, TSC, TUN, UEI, UFI, UOS, UOV, UOZ, USI, UTL, UWY, VET, VFI, VNI, VSV, WEI, -WEN, YUG, ZON, mixtures of two or more thereof, and mixed types of two or more thereof. According to the present invention, it is preferred that the framework structure type of the zeolitic material is one of AEI, GME, BEA, CHA, FAU, FER, HEU, LEV, MEI, MEL, MFI, or MOR, more preferably one of AEI, GME, CHA, MFI, BEA, FAU, or MOR, more preferably one of CHA, AEI, or BEA, more preferably one of CHA and/or AEI, and more preferably CHA.

Therefore, the present invention preferably relates to a catalyst comprising a washcoat comprising one or more layers, the washcoat being disposed on a substrate, wherein the washcoat comprises
(i) platinum supported on zirconia-alumina, and
(ii) a zeolitic material having framework structure type CHA and comprising one or more of Cu and Fe.

With regard to the zeolitic material, it is preferred that it is in its calcined state. According to the present invention, the zeolitic material may comprise any further chemical elements, provided that these elements can establish one or more of the above defined framework type. However, it is preferred that the framework structure of the zeolitic material comprises Si, Al, O and H, and wherein at least 99.0 weight-%, preferably at least 99.5 weight-%, more preferably at least 99.9 weight-% of the framework structure of the zeolitic material consist of Si, Al, O and H.

As regards the oxidic compound of V that may be contained in the washcoat of the inventive catalyst, no restrictions apply to the chemical nature of said compound, provided that it comprises an oxygen atom bound to a vanadium atom. It is preferred that the oxidic compound of V is one or more of an ammonium vanadate, a sodium vanadate, an iron vanadate, vanadium pentoxide and vanadium pentoxide stabilized with ferric oxide. According to the present invention, a vanadate may be a compound containing an oxoanion of vanadium generally in its highest oxidation state of +5. The simplest vanadate may be the $VO_4^{3-}$ anion (orthovanadate), which is present for example in sodium orthovanadate and in solutions of $V_2O_5$ in a strong base (pH>13). Other vanadates may be the $V_2O_7^{4-}$ anion and the $V_3O_9^{3-}$ anion.

As regards the oxidic compound of W that may be contained in the washcoat of the inventive catalyst, again no restrictions apply to the chemical nature of said compound, provided that it comprises an oxygen atom bound to a tungsten atom. It is preferred that the oxidic compound of W is one or more of an ammonium tungstate, a sodium tungstate and tungsten trioxide. According to the present invention, a tungstate may be a compound that contains an oxoanion of tungsten or is a mixed oxide containing tungsten. The simplest tungstate ion may be the $WO_4^{2-}$ anion (orthotungstate).

Further, it is preferred according to the present invention that one or more of the oxidic compound of V and the oxidic compound of W is supported on one or more of titania and zirconia-titania, preferably on titania. Thus, it is particularly preferred that the oxidic compound of V is supported on titania.

When the washcoat comprises one or more of an oxidic compound of V and an oxidic compound of W, no restriction applies as to the amount of the one or more of an oxidic compound of V and an oxidic compound of W that may be contained in the washcoat. Thus, any suitable amount of the one or more of an oxidic compound of V and an oxidic compound of W may be contained in the washcoat. In this regard, the amount of an oxidic compound of V is calculated as $V_2O_5$ and the amount of an oxidic compound of W is calculated as $WO_3$. Thus, the washcoat may comprise an oxidic compound of V, calculated as $V_2O_5$, in the range of from 0.1 to 10 weight-%, preferably of from 1 to 9 weight-%, more preferably of from 2 to 8 weight-%, more preferably of from 3 to 7 weight-%, more preferably of from 3.5 to 6 weight-%, more preferably of from 4 to 5 weight-%, based on the total weight of the washcoat.

Further, the washcoat may comprise an oxidic compound of W, calculated as $WO_3$, in the range of from 1 to 20 weight-%, preferably of from 3 to 18 weight-%, more preferably of from 5 to 16 weight-%, more preferably of from 7 to 14 weight-%, more preferably of from 9 to 13 weight-%, based on the total weight of the washcoat.

Further, it is preferred that the washcoat of the inventive catalyst comprises a zeolitic material comprising one or more of Cu and Fe. As regards the zeolitic material comprising one or more of Cu and Fe, no restriction applies on how the one or more of Cu and Fe is comprised in the zeolitic material. Thus, the one or more of Cu and Fe may be comprised in the zeolitic material as framework structure element or non-framework structure element. According to the present invention, it is preferred that the one or more of Cu and Fe is comprised in the zeolitic material as non-framework structure element.

As mentioned above, it is preferred that the washcoat comprises a zeolitic material comprising one or more of Cu and Fe. Further, it is particularly preferred that the washcoat comprises a zeolitic material comprising Cu, preferably as non-framework structure element.

Therefore, the present invention preferably relates to a catalyst comprising a washcoat comprising one or more layers, the washcoat being disposed on a substrate, wherein the washcoat comprises
(i) platinum supported on zirconia-alumina, and
(ii) a zeolitic material having framework structure type CHA and comprising Cu.

Furthermore, it is preferred according to the present invention that the framework structure of the zeolitic material comprises Si and Al and that the zeolitic material further comprises Cu.

When the zeolitic material comprising Cu is comprised in the washcoat, it is further preferred that the zeolitic material comprises Si, Al, O, H and Cu in any conceivable amount thereof.

However, it is preferred that at least 99.0 weight-%, preferably at least 99.5 weight-%, more preferably at least 99.9 weight-% of the zeolitic material consist of Si, Al, O, H and Cu.

When the washcoat comprises a zeolitic material comprising Cu, any suitable amount of Cu may be comprised in the zeolitic material. The zeolitic material preferably comprises Cu, calculated as CuO, in an amount in the range of from 0.1 to 5 weight-%, more preferably of from 1.0 to 4.5 weight-%, more preferably of from 2 to 4 weight-%, more preferably of from 2.5 to 3.5 weight-%, more preferably of from 3 to 3.5 weight-%, based on the total weight of the zeolitic material.

A zeolitic material having the framework structure CHA and comprising Cu can be prepared according to conventional methods. In view of a direct synthesis of a zeolitic material having the framework structure CHA comprising Cu and/or a preparation method including incorporation of Cu into a zeolitic material via ion-exchange, reference is made to U.S. Pat. No. 9,272,272 B2, U.S. Pat. No. 8,715,618 B2, U.S. Pat. No. 8,293,199 B2, U.S. Pat. No. 8,883,119 B2, U.S. Pat. No. 8,961,914 B2 and U.S. Pat. No. 9,242,238 B2, in particular to the Examples and preferred preparation methods as disclosed in said documents, all of which are respectively incorporated herein by reference.

Therefore, the present invention preferably relates to a catalyst comprising a washcoat comprising one or more layers, the washcoat being disposed on a substrate, wherein the washcoat comprises
(i) platinum supported on zirconia-alumina, and
(ii) a zeolitic material having framework structure type CHA and comprising Cu, wherein the zeolitic material comprises Cu, calculated as CuO, in an amount in the range of from 0.1 to 5 weight-%, more preferably of from 1.0 to 4.5 weight-%, more preferably of from 2 to 4 weight-%, more preferably of from 2.5 to 3.5 weight-% more preferably of from 3 to 3.5 weight-%, based on the total weight of the zeolitic material.

Therefore, the present invention more preferably relates to a catalyst comprising a washcoat comprising one or more layers, the washcoat being disposed on a substrate, wherein the washcoat comprises
(i) platinum supported on zirconia-alumina, and
(ii) a zeolitic material having framework structure type CHA and comprising Cu, wherein the zeolitic material comprises Cu, calculated as CuO, in an amount in the range of from 0.1 to 5 weight-%, more preferably of from 1.0 to 4.5 weight-%, more preferably of from 2 to 4 weight-%, more preferably of from 2.5 to 3.5 weight-% more preferably of from 3 to 3.5 weight-%, based on the total weight of the zeolitic material, wherein at least at least 99.5 weight-%, preferably at least 99.9 weight-% of the zeolitic material consist of Si, Al, O, H and Cu.

When the washcoat comprises a zeolitic material comprising Fe, it is preferred that the zeolitic material comprises Fe as a non-framework structure element. Further preferably, the framework structure of the zeolitic material comprises Si and Al and that the zeolitic material comprises Fe. The zeolitic material comprises Si, Al, O, H and Fe in any conceivable amounts. It is preferred that at least 99.0 weight-%, preferably at least 99.5 weight-%, more preferably at least 99.9 weight-% of the zeolitic material consist of Si, Al, O, H and Fe. When the washcoat comprises a zeolitic material comprising Fe, any suitable amount of Fe may be comprised in the one or more of a zeolitic material. Thus, the zeolitic material may comprise Fe, calculated as $Fe_2O_3$, in an amount in the range of from 0.1 to 5 weight-%, preferably of from 1.0 to 4.5 weight-%, more preferably of from 2 to 4 weight-%, more preferably of from 3 to 3.5 weight-%, based on the total weight of the zeolitic material.

When the washcoat comprises a zeolitic material comprising one or more of Cu and Fe, there is no particular restriction as to how the one or more of Cu and Fe comprised in the zeolitic material, preferably as non-framework structure element, has been introduced therein. Thus, the one or more of Cu and Fe comprised in the zeolitic material as non-framework structure element may be introduced therein using any suitable method, wherein the introduction is preferably effected by means of impregnation of the zeolitic material with a salt of the metal and/or by ion-exchange of the metal ion. It is particularly preferred that the one or more of Cu and Fe comprised in the zeolitic material, preferably as non-framework structure element, has been introduced into the zeolitic material by ion-exchange.

According to the present invention, the washcoat may comprise a binder material, for example a metal oxide binder material. There is no specific restriction as regards the amount and chemical nature of the binder material. It is preferred that the washcoat additionally comprises (iii) a metal oxide binder material.

Therefore, the present invention preferably relates to a catalyst comprising a washcoat comprising one or more layers, the washcoat being disposed on a substrate, wherein the washcoat comprises
(i) platinum supported on zirconia-alumina,
(ii) a zeolitic material having framework structure type CHA and comprising Cu, wherein the zeolitic material comprises Cu, calculated as CuO, in an amount in the range of from 0.1 to 5 weight-%, more preferably of from 1.0 to 4.5 weight-%, more preferably of from 2 to 4 weight-%, more preferably of from 2.5 to 3.5 weight-% more preferably of from 3 to 3.5 weight-%, based on the total weight of the zeolitic material, wherein at least at least 99.5 weight-%, preferably at least 99.9 weight-% of the zeolitic material consist of Si, Al, O, H and Cu, and
(iii) a metal oxide binder material.

As regards the metal oxide binder material, no restrictions apply as to the chemical nature of the metal oxide binder material, provided that it comprises a metal atom bound to an oxygen atom. It is, however, preferred according to the present invention that the metal oxide binder material is one or more of zirconia, alumina, silica, titania, silica-zirconia and zirconia-titania, preferably one or more of zirconia and zirconia-titania, more preferably zirconia.

Therefore, the present invention preferably relates to a catalyst comprising a washcoat comprising one or more layers, the washcoat being disposed on a substrate, wherein the washcoat comprises
(i) platinum supported on zirconia-alumina,
(ii) a zeolitic material having framework structure type CHA and comprising Cu, wherein the zeolitic material comprises Cu, calculated as CuO, in an amount in the range of from 0.1 to 5 weight-%, more preferably of from 1.0 to 4.5 weight-%, more preferably of from 2 to 4 weight-%, more preferably of from 2.5 to 3.5 weight-% more preferably of from 3 to 3.5 weight-%, based on the total weight of the zeolitic material, wherein at least at least 99.5 weight-%, preferably at least 99.9 weight-% of the zeolitic material consist of Si, Al, O, H and Cu, and
(iii) zirconia as a metal oxide binder material.

Concerning the substrate onto which the washcoat comprising one or more layers is provided in the inventive catalyst, no particular restrictions apply such that any suitable substrate may be provided to this effect, provided that a washcoat may be disposed thereon. In particular, the type of substrate which may be contained in the inventive catalyst is restricted neither with respect to its shape nor with respect to the materials of which it consists.

Thus, the substrate contained in the inventive catalyst may comprise any suitable substance or substances, wherein the substrate preferably comprises one or more of a ceramic and a metallic substance, and preferably comprises a ceramic substance. Among the preferred ceramic substances, it is particularly preferred that the substrate comprises one or more of alumina, silica, silicates, aluminosilicates, aluminotitanates, silicon carbide, cordierite, mullite, zirconia, spinel, magnesia, and titania, more preferably one or more of alpha-alumina, aluminotitanates, silicon carbide, and cordierite, more preferably one or more of $Al_2TiO_5$, SiC, and cordierite, wherein more preferably the substrate comprises cordierite, wherein more preferably the substrate consists of cordierite. Independently thereof, the shape of the substrate comprised in the inventive catalyst may, by way of example, be one or more of a granule, a pellet, a mesh, a ring, a sphere, a cylinder, a hollow cylinder and a monolith, wherein the substrate is preferably a monolith, more preferably a honeycomb monolith, wherein the honeycomb monolith is preferably a wall-flow or flow-through monolith, preferably a flow-through monolith.

Further, it is preferred according to the present invention that the substrate has a plurality of longitudinally extending passages formed by longitudinally extending walls bounding and defining the passages and a longitudinal total length extending between a front end and a rear end of the substrate.

As mentioned above, there is no particular restriction as regards the number of layers the washcoat comprises.

According to a first embodiment of the present invention, the washcoat comprises, preferably consists of one layer. Under the condition that the substrate has a substrate length, wherein the substrate is preferably as defined herein, the one layer may be disposed on the substrate in any length. It is preferred that the one layer is disposed on 50 to 100%, preferably on 75 to 100%, more preferably on 95 to 100%, more preferably on 100% of the total length of the substrate.

When the washcoat consists of one layer, according to the particular and preferred embodiments of the inventive catalyst wherein a platinum group metal is comprised in the one layer, there is in principle no particular restriction as to the loading of the platinum group metal. Preferably, the loading of a platinum group metal comprised in the one layer is in the range of from 1 to 15 $g/ft^3$, more preferably of from 3 to 10 $g/ft^3$, more preferably of from 4.5 to 8.5 $g/ft^3$, more preferably of from 5.5 to 8.5 $g/ft^3$, more preferably of from 7.5 to 8.5 $g/ft^3$.

When the washcoat consists of one layer, in accordance with the particular and preferred embodiments of the inventive catalyst, there is in principle no restriction as to the loading of a zeolitic material in the one layer. Preferably, the loading of the zeolitic material comprised in the one layer is in the range of from 1.0 to 4.5 g/in$^3$, more preferably of from 1.5 to 4.0 g/in$^3$, more preferably of from 2.0 to 3.75 g/in$^3$, more preferably of from 2.75 to 3.5 g/in$^3$.

According to the present invention, it is, thus, particularly preferred that the inventive catalyst consists of the washcoat disposed on the substrate and the washcoat consists of one layer.

According to a second embodiment of the present invention, the washcoat comprises, preferably consists of two layers, a first layer and a second layer.

When the washcoat consists of a first and a second layer, there is in principle no restriction whether the one or more of an oxidic compound of V, an oxidic compound of W and a zeolitic material comprising one or more of Cu and Fe is contained in the first layer, or in the second layer, or in the first and the second layer. It is preferred according to the present invention that the one or more of an oxidic compound of V, an oxidic compound of W and a zeolitic material comprising one or more of Cu and Fe is contained in the first layer. Further, it is preferred that the one or more of an oxidic compound of V, an oxidic compound of W and a zeolitic material comprising one or more of Cu and Fe is as defined herein. Thus, the oxidic compound of V, the oxidic compound of W and the zeolitic material comprising one or more of Cu and Fe is preferably as defined hereinabove.

When the washcoat consists of a first layer and a second layer, it is preferred that the first layer comprises a zeolitic material comprising one or more of Cu and Fe. There is in principle no restriction as to the loading of a zeolitic material contained in the first layer. Preferably, the zeolitic material is contained in the first layer at a loading in the range of from 1.5 to 4.0 g/in$^3$, more preferably of from 2.0 to 4.0 g/in$^3$, more preferably of from 2.0 to 3.5 g/in$^3$, more preferably of from 3.0 to 3.5 g/in$^3$.

When the washcoat consists of a first layer and a second layer, the first layer may further comprise a binder material, for example a metal oxide binder material. Further, it is preferred that the binder material is as defined herein. Accordingly, it is preferred that the metal oxide binder material is as defined herein. According to the particular and preferred embodiments of the inventive catalyst wherein the first layer comprises a metal oxide binder material, there is in principle no particular restriction as to the loading of a metal oxide binder material. Preferably, the loading of a metal oxide binder material contained in the first layer is in the range of from 0.02 to 0.25 g/in$^3$, more preferably of from 0.07 to 0.25 g/in$^3$, more preferably of from 0.1 to 0.25 g/in$^3$, more preferably of from 0.2 to 0.25 g/in$^3$.

When the washcoat consists of a first layer and a second layer, it is particularly preferred that the first layer is substantially free of Pt, preferably substantially free of one ore more of Pd and Pt, more preferably substantially free of one or more platinum group metal. Thus, it is preferred according to the present invention that the first layer does not comprise the platinum group metal supported on the metal oxide support material. More preferably, the first layer consists of the zeolitic material comprising one or more of Cu and Fe, and preferably the metal oxide binder material.

When the washcoat consists of a first layer and a second layer, there is in principle no restriction with regard to the platinum group metal supported on the metal oxide support material whether it is contained in the first layer, the second layer or in the first and the second layer. However, it is preferred according to the present invention that the platinum group metal supported on a metal oxide support material is contained in the second layer. Further, it is preferred that the platinum group metal supported on a metal oxide support material is as defined herein. Accordingly, it is preferred that at least one of the platinum group metal and the support material is as defined herein, respectively. According to the present invention, there is in principle no restriction as to the loading of the platinum group metal contained in the second layer. Preferably, the platinum group metal is contained in the second layer at a loading in the range of from 2 to 30 g/ft$^3$, more preferably of from 6 to 20 g/ft$^3$, more preferably of from 9.5 to 17 g/ft$^3$, more preferably of from 11 to 17 g/ft$^3$.

When the washcoat consists of a first layer and a second layer, it is particularly preferred that the second layer is substantially free of Cu, preferably substantially free of one ore more of Cu and Fe, more preferably substantially free of Cu, Fe, V and W. Thus, it is preferred according to the present invention that the second layer does not comprise an oxidic compound of V, an oxidic compound of W and a zeolitic material comprising one or more of Cu and Fe. Further, it is preferred that the second layer is substantially free of a metal oxide binder material, wherein the metal oxide binder material is preferably as defined herein. Thus, more preferably, the second layer does not comprise the metal oxide binder material. More preferably, the second layer consists of the platinum group metal supported on a metal oxide support material.

When the washcoat consists of a first layer and a second layer, no restriction applies in principle as to the order in which the first layer and the second layer are disposed on the substrate and/or onto each other. Thus, the first layer or the second layer may be disposed directly on the substrate. As a first alternative, the first layer is disposed on the substrate and the second layer is at least partially disposed on the first layer. Furthermore, it is preferred that the first layer is disposed on the substrate and the second layer is completely disposed on the first layer. As a second alternative, the second layer is disposed on the substrate and the first layer is at least partially disposed on the second layer. Furthermore, it is preferred that the second layer is disposed on the substrate and the first layer is completely disposed on the second layer.

As regards above mentioned first alternative when the first layer is disposed on the substrate and the second layer is at least partially disposed on the first layer, when the washcoat consists of a first layer and a second layer and under the condition that the substrate has a plurality of longitudinally extending passages formed by longitudinally extending walls bounding and defining the passages and a longitudinal total length extending between a front end and a rear end of the substrate, the first layer may be disposed on the substrate in any length. Preferably, the first layer is disposed on 50 to 100%, more preferably on 75 to 100%, more preferably on 95 to 100%, more preferably on 100% of the total length of the substrate, preferably from the front end of the substrate. Further, the second layer may be disposed in any length. Thus, the second layer may be at least partially disposed either on the substrate or on the first layer. Preferably, the second layer is disposed on 25 to 75%, more preferably on 35 to 65%, more preferably on 45 to 55%, more preferably on 50% of the total length of the substrate, preferably from the rear end of the substrate.

As regards above mentioned second alternative when the second layer is disposed on the substrate and the first layer is at least partially disposed on the second layer, when the washcoat consists of a first layer and a second layer and under the condition that the substrate has a plurality of longitudinally extending passages formed by longitudinally extending walls bounding and defining the passages and a longitudinal total length extending between a front end and a rear end of the substrate, the second layer may be disposed on the substrate in any length. Preferably, the second layer is disposed on 50 to 100%, more preferably on 75 to 100%, more preferably on 95 to 100%, more preferably on 100% of the total length of the substrate, preferably from the front end of the substrate. Further, the first layer may be disposed in any length. Thus, the first layer may be at least partially disposed either on the substrate or on the second layer. Preferably, the first layer is disposed on 50 to 100%, more preferably on 75 to 100%, more preferably on 95 to 100%, more preferably on 100% of the total length of the substrate, preferably from the rear end of the substrate.

According to a third embodiment of the present invention, the washcoat comprises, preferably consists of three layers, a first layer and a second layer and a third layer.

Preferably, at least one of the first layer and the second layer is as defined hereinabove. In principle, the third layer may comprise one or more of an oxidic compound of V, an oxidic compound of W and a zeolitic material comprising one or more of Cu and Fe and/or a platinum group metal supported on a metal oxide support material. Further, it is preferred that the oxidic compound of V, the oxidic compound of W, the zeolitic material comprising one or more of Cu and Fe and the platinum group metal supported on a metal oxide support material is as defined herein, respectively, if contained in the third layer. Accordingly, at least one of the oxidic compound of V, the oxidic compound of W, the zeolitic material comprising one or more of Cu and Fe, the platinum group metal and the metal oxide support material is preferably as defined herein, respectively.

When the washcoat consists of a first layer, a second layer and a third layer, it is preferred that the third layer comprises one or more of an oxidic compound of V, an oxidic compound of W and a zeolitic material comprising one or more of Cu and Fe. Thus, it is preferred that the one or more of an oxidic compound of V, the oxidic compound of W and the zeolitic material comprising one or more of Cu and Fe are as defined herein. Accordingly, the oxidic compound of V, the oxidic compound of W and the zeolitic material comprising one or more of Cu and Fe are as defined herein, respectively.

When the washcoat consists of a first layer, a second layer and a third layer, it is further preferred that the third layer is substantially free of Pt, preferably substantially free of one ore more of Pd and Pt, more preferably substantially free of one or more platinum group metal. Thus, it is preferred according to the present invention that the third layer does not comprise a platinum group metal supported on a metal oxide support material. More preferably, the third layer consists of the one or more of an oxidic compound of V, an oxidic compound of W and a zeolitic material comprising one or more of Cu and Fe, and preferably a metal oxide binder material.

When the washcoat consists of a first layer, a second layer and a third layer, it is preferred that the third layer comprises a zeolitic material comprising one or more of Cu and Fe, wherein the zeolitic material is preferably as defined herein. According to the present invention, there is in principle no restriction as to the loading of the zeolitic material contained in the third layer. Preferably, the zeolitic material is contained in the third layer at a loading in the range of from 0.2 to 0.8 g/in$^3$, more preferably of from 0.3 to 0.7 g/in$^3$, more preferably of from 0.4 to 0.6 g/in$^3$.

When the washcoat consists of a first layer, a second layer and a third layer, the third layer may further comprise a binder material, for example a metal oxide binder material. Further, it is preferred that the binder material is as defined herein. Accordingly, it is preferred that the metal oxide binder material is as defined herein. According to the particular and preferred embodiments of the inventive catalyst wherein the third layer comprises a metal oxide binder material, there is in principle no particular restriction as to the loading of the metal oxide binder material in the third layer. Preferably, the loading of the metal oxide binder material comprised in the third layer is in the range of from 0.02 to 0.14 g/in$^3$, more preferably of from 0.05 to 0.11 g/in$^3$, more preferably of from 0.07 to 0.09 g/in$^3$.

When the consists of a first layer, a second layer and a third layer, no restriction applies in principle as to the order in which the first layer, the second layer and the third layer are disposed on the substrate and/or onto each other. Thus, the first layer, the second layer or the third layer may be disposed on the substrate. Furthermore, it is particularly preferred that the first layer is disposed on the substrate and the second layer is at least partially, preferably completely, disposed on the substrate. Thus, it is preferred according to the present invention that the first layer is disposed on the substrate, the second layer is at least partially disposed on the substrate and the third layer is at least partially, preferably completely, disposed on the second layer.

When the washcoat consists of a first layer, a second layer and a third layer and under the condition that the substrate, wherein the substrate is preferably as defined herein, has a plurality of longitudinally extending passages formed by longitudinally extending walls bounding and defining the passages and a longitudinal total length extending between a front end and a rear end of the substrate, it is preferred that the third layer is disposed on 25 to 75%, more preferably on 35 to 65%, more preferably on 45 to 55% of the total length of the substrate, preferably from the rear end of the substrate.

When the washcoat consists of a first layer, a second layer and a third layer and under the condition that the substrate, wherein the substrate is preferably as defined herein, has a plurality of longitudinally extending passages formed by longitudinally extending walls bounding and defining the passages and a longitudinal total length extending between a front end and a rear end of the substrate, it is, preferred that the first layer is disposed on 25 to 75%, more preferably on 35 to 65%, more preferably on 45 to 55%, more preferably on 50% of the total length of the substrate from the front end of the substrate and the second layer is disposed on 25 to 75%, more preferably on 35 to 65%, more preferably on 45 to 55%, more preferably on 50% of the total length of the substrate from the rear end of the substrate, wherein the first and the second layer in total are preferably disposed on 100% of the total length of the substrate. Further, the third layer may be disposed on the first layer and/or on the second layer. It is preferred that the third layer is disposed on the second layer. Thus, no restriction applies as to the length of the third layer. Thus, by way of example, the third layer may be disposed on 25 to 75%, preferably on 35 to 65%, more preferably on 45 to 55%, more preferably on 50% of the total length of the substrate, preferably from the rear end of the substrate. It is preferred according to the present invention that the third layer has the same length as the second layer.

According to a particular embodiment of the present invention, it is preferred that the washcoat consists of the first, the second and the third layer, wherein at least one of the first, second and third layer is preferably as defined hereinabove. It is more preferred that the first, second and third layer are as defined herein.

Furthermore, it is preferred that the catalyst of the present invention is comprised, as a second catalyst, in a sequence of two or more catalysts, preferably of two catalysts, wherein a first catalyst is comprised in said sequence, which first catalyst is preferably located upstream of said second catalyst in an exhaust gas treatment system, preferably in an exhaust gas treatment system as described hereinunder. In principle, there is no restriction as to the chemical structure of the substrate of said first catalyst. It is preferred that the substrate is as defined hereinabove, more preferably as being of the same chemical structure as the substrate of the catalyst as defined herein, more preferably as being identical with the substrate of the catalyst as defined hereinabove. Thus, it is preferred that the substrate of said second catalyst comprises a washcoat layer comprising one or more of an oxidic compound of V, an oxidic compound of W, and a zeolitic material comprising one or more of Cu and Fe. It is particularly preferred that the one or more of an oxidic compound of V, an oxidic compound of W, and a zeolitic material comprising one or more of Cu and Fe is preferably as defined herein. Accordingly, at least one of the oxidic compound of V, the oxidic compound of W and the zeolitic material comprising one or more of Cu and Fe is preferably as defined herein.

Preferably, the total loading of the catalyst with respect to the sum of V, W and Ti, also referred to as total VWT loading and being calculated as the total loading of $V_2O_5$, $WO_3$ and $TiO_2$, may be in the range of from 1 to 5 g/in$^3$.

Furthermore, it is preferred according to the present invention that the inventive catalyst according to any of the particular and preferred embodiments defined in the present invention is used in a process for an exhaust gas treatment as a tetrafunctional catalyst for the simultaneous selective catalytic reduction of $NO_x$, the oxidation of ammonia, the oxidation of nitrogen monoxide and the oxidation of a hydrocarbon.

Moreover, the present invention relates to the use of the inventive catalyst for the simultaneous selective catalytic reduction of $NO_x$, the oxidation of ammonia, the oxidation of nitrogen monoxide and the oxidation of a hydrocarbon, preferably in a treatment of an exhaust gas.

Further, the present invention relates to the use of the inventive catalyst for the treatment of an exhaust gas, preferably for the treatment of an industrial or an automotive exhaust gas, more preferably for the treatment of an automotive exhaust gas. Thus, it is preferred that the automotive exhaust gas is an exhaust gas of an internal combustion engine, more preferably a diesel engine, more preferably a heavy-duty diesel engine.

Moreover, the present invention relates to a method for the simultaneous selective catalytic reduction of $NO_x$, the oxidation of ammonia, the oxidation of nitrogen monoxide and the oxidation of a hydrocarbon, preferably in a treatment of an exhaust gas, using a catalyst according to any of the particular and preferred embodiments defined in the present application.

Further, the present invention relates to a method for the treatment of an exhaust gas, preferably for the treatment of an industrial or an automotive exhaust gas, more preferably for the treatment of an automotive exhaust gas, using a catalyst according to any of the particular and preferred embodiments defined in the present application. Thus, it is preferred that the automotive exhaust gas is an exhaust gas of an internal combustion engine, preferably a diesel engine, more preferably a heavy-duty diesel engine.

According to a particular preferred embodiment of the present invention, the catalyst according to any of the particular and preferred embodiments defined herein is comprised in an exhaust gas treatment system which is preferably in fluid communication with an internal combustion engine, preferably a diesel engine, more preferably a heavy-duty diesel engine.

Moreover, the present invention relates to an exhaust gas treatment system, preferably in fluid communication with an internal combustion engine, said exhaust gas system comprising the catalyst described hereinabove and in any one of the particular and preferred embodiments defined in the present application, wherein the internal combustion engine is preferably a diesel engine, more preferably a heavy-duty diesel engine. As regards the exhaust gas treatment system of the present invention, no particular restrictions apply as to any further components which may be comprised therein.

Preferably, the exhaust gas treatment system one or more components in addition to the catalyst described hereinabove. More preferably, the exhaust gas treatment system comprises one or more of a catalyst for the selective catalytic reduction of $NO_x$, and a catalyzed soot filter. Optionally, the exhaust gas treatment system comprises a catalyst for the oxidation of ammonia. Preferably, the exhaust gas treatment system comprises one or more reductant injectors, more preferably two or more reductant injectors, more preferably two reductant injectors. Preferably, at least one reductant injector, preferably all reductant injectors are urea injectors.

Therefore, the present invention also relates to the exhaust gas treatment system above, comprising a first reductant injector, a first catalyst for the selective catalytic reduction of $NO_x$, preferably the first catalyst as defined hereinabove and in particular in embodiment 55 or 56 hereinbelow, a second catalyst, wherein said second catalyst is the catalyst as described hereinabove and in the embodiments 1 to 56 hereinbelow;

a catalyzed soot filter, a second reductant injector, a third catalyst for the selective catalytic reduction of $NO_x$, and a fourth catalyst for the selective catalytic reduction of $NO_x$ and/or for the oxidation of ammonia.

Regarding the positions of said components in the exhaust gas treatment system, no specific restrictions exist, provided that the exhaust gas stream can be treated therewith according to the specific needs. Preferably, the first catalyst is located upstream of the second catalyst, the second catalyst is located upstream of the third catalyst, and the third catalyst is located upstream of the fourth catalyst. Further, it is preferred that a first reductant injector is located upstream of the first catalyst. Yet further, it is preferred that a second reductant injector is located upstream of the third catalyst wherein it is more preferred that it is located downstream of the catalyzed soot filter and upstream of the third catalyst.

Preferably, in the exhaust gas treatment system of the present invention, no diesel oxidation catalyst is located downstream of the second catalyst and upstream of the catalyzed soot filter. More preferably, in the exhaust gas treatment system of the present invention, no diesel oxidation catalyst is located upstream of the catalyzed soot filter. More preferably, the exhaust gas treatment system of the present invention contains no diesel oxidation catalyst.

According to the present invention, it is preferred that the exhaust gas treatment system contains no further catalyst in addition to the catalysts described hereinabove. Therefore, with regard to catalytic components and reductant injectors, it is preferred that the exhaust gas treatment system of the present invention consists of
a first reductant injector,
a first catalyst for the selective catalytic reduction of $NO_x$, preferably the first catalyst as defined hereinabove and in particular in embodiment 55 or 56 hereinbelow,
a second catalyst, wherein said second catalyst is the catalyst as described hereinabove and in the embodiments 1 to 56 hereinbelow;
a catalyzed soot filter,
a second reductant injector,
a third catalyst for the selective catalytic reduction of $NO_x$, and
a fourth catalyst for the selective catalytic reduction of $NO_x$ and/or for the oxidation of ammonia.

Thus, with regard to catalytic components and reductant injectors, it is more preferred that the exhaust gas system of the present invention consists of
a first reductant injector, which is located upstream of
a first catalyst for the selective catalytic reduction of $NO_x$, preferably the first catalyst as defined hereinabove and in particular in embodiment 55 or 56 hereinbelow, which is located upstream of
a second catalyst, wherein said second catalyst is the catalyst of any one of embodiments 1 to 56, which is located upstream of
a catalyzed soot filter, which is located upstream of
a second reductant injector, which is located upstream of
a third catalyst for the selective catalytic reduction of $NO_x$, which is located upstream of
a fourth catalyst for the selective catalytic reduction of $NO_x$ and/or for the oxidation of ammonia.

Generally, it is also conceivable according to the present invention that the exhaust gas treatment system comprises
a reductant injector, preferably a urea injector, which is located upstream of
a catalyst for the selective catalytic reduction of $NO_x$ and/or for the oxidation of ammonia, preferably for the selective catalytic reduction of $NO_x$ and for the oxidation of ammonia, which is located upstream of
a catalyzed soot filter, which is located upstream of
a reductant injector, preferably a urea injector, which is located upstream of
a catalyst for the selective catalytic reduction of $NO_x$, which is located upstream of
a catalyst for the selective catalytic reduction of $NO_x$ and/or for the oxidation of ammonia, preferably the selective catalytic reduction of $NO_x$ and for the oxidation of ammonia;
wherein, preferably and with regard to catalytic components and reductant injectors, the exhaust gas treatment system consists of
a reductant injector, preferably a urea injector, which is located upstream of
a catalyst for the selective catalytic reduction of $NO_x$ and/or for the oxidation of ammonia, preferably for the selective catalytic reduction of $NO_x$ and for the oxidation of ammonia, which is located upstream of
a catalyzed soot filter, which is located upstream of
a reductant injector, preferably a urea injector, which is located upstream of
a catalyst for the selective catalytic reduction of NOR, which is located upstream of
a catalyst for the selective catalytic reduction of $NO_x$ and/or for the oxidation of ammonia, preferably the selective catalytic reduction of $NO_x$ and for the oxidation of ammonia;
wherein, in particular, no diesel oxidation catalyst is located upstream of the catalyzed soot filter, and wherein, in particular, no diesel oxidation catalyst is comprised in the exhaust gas treatment system.

Moreover, the present invention relates to a method for the simultaneous selective catalytic reduction of $NO_x$, the oxidation of ammonia, the oxidation of nitrogen monoxide and the oxidation of a hydrocarbon, comprising
(1) providing a gas stream comprising one or more of $NO_x$, ammonia, nitrogen monoxide and a hydrocarbon;
(2) contacting the gas stream provided in (1) with the catalyst of any of the particular and preferred embodiments defined in the present application.

Thus, it is preferred that the gas stream is an exhaust gas stream from an internal combustion engine, preferably a diesel engine, more preferably a heavy-duty diesel engine. According to the inventive method, it is preferred that the gas stream treated by contacting with the inventive catalyst comprises one or more reducing agents for selective catalytic reduction of $NO_x$. To this effect, any suitable reducing agent or combination of reducing agents may be employed, provided that they may reduce $NO_x$ to nitrogen gas. According to the inventive method, it is however preferred that urea and/or ammonia is comprised among the reducing agents used, wherein more preferably urea and/or ammonia is employed as the reducing agent in the inventive method, preferably ammonia. Therefore, it is preferred according to the inventive method that the gas stream further comprises one or more reducing agents, the one or more reducing agents preferably comprising urea and/or ammonia, preferably ammonia.

As described above, it is preferred that the catalyst of the present invention described above is comprised in an exhaust gas treatment system, preferably in an exhaust gas treatment system described above. Therefore, the present invention also relates to a method for the simultaneous selective catalytic reduction of $NO_x$, the oxidation of ammonia, the oxidation of nitrogen monoxide and the oxidation of a hydrocarbon, comprising
(1) providing a gas stream comprising one or more of $NO_x$, ammonia, nitrogen monoxide and a hydrocarbon;
(2) introducing the gas stream into an the exhaust gas treatment system described above and passing the gas stream through the system.

As regards the gas stream comprising one or more of $NO_x$, ammonia, nitrogen monoxide and a hydrocarbon, there is no particular restriction according to the present invention as to how said gas stream is provided, such that it may stem from any conceivable source. It is, however, preferred according to the present invention that the gas stream comprises a $NO_x$ containing exhaust gas stream from an internal combustion engine, preferably from a diesel engine.

Moreover, the present invention relates to a process for preparing the catalyst of any of the particular and preferred embodiments defined in the present application, the process comprising disposing one or more slurries on a substrate, the one or more slurries comprising the platinum group metal supported on a metal oxide support material and one or more of the oxidic compound of V, the oxidic compound of W and the zeolitic material comprising one or more of Cu and Fe, wherein, after having disposed a slurry on the substrate, a slurry-treated substrate is obtained which is dried and calcined.

Further, it is preferred that the one or more slurries comprise one or more of a first slurry, a second slurry and a third slurry. Thus, it is preferred that the one or more slurries comprise a first slurry.

Therefore, the present invention relates to a process for preparing the catalyst of any of the particular and preferred embodiments defined in the present application, the process comprising (a) disposing a first slurry on a substrate, obtaining a slurry-treated substrate;
(b) drying the slurry-treated substrate obtained from (a),
(c) calcining the dried slurry-treated substrate obtained from (b), obtaining the substrate having a first layer disposed thereon.

According to a preferred embodiment of the process, the first slurry comprises the platinum group metal supported on a metal oxide support material and/or the one or more of an oxidic compound of V, an oxidic compound of W and a zeolitic material comprising one or more of Cu and Fe. However, it is particularly preferred that the first slurry comprises the platinum group metal supported on a metal oxide support material and the one or more of an oxidic compound of V, an oxidic compound of W and a zeolitic material comprising one or more of Cu and Fe.

Furthermore, it is preferred that the first slurry further comprises a disposing adjuvant. Thus, there is no restriction as regards the chemical structure of the disposing adjuvant provided that the disposal adjuvant is suitable to aid the disposing of the first slurry on the substrate. It is particularly preferred according to the present invention that the first slurry comprises one or more of tartaric acid and monoethanolamine, more preferably tartaric acid and monoethanolamine.

According to the inventive process wherein the first slurry is disposed on the substrate, there is no restriction as regards the length in which the first slurry is disposed on the substrate. Thus, it is preferred that the substrate is as defined herein, more preferably having a substrate length. Thus, the first slurry may be disposed on the substrate, wherein the substrate has a substrate length, in any length relative to the length of the substrate. Thus, by way of example, the first slurry may be disposed on 50 to 100%, preferably on 75 to 100%, more preferably on 95 to 100%, more preferably on 100% of the total length of the substrate.

As regards the drying in (b), no restrictions apply such that the drying may be effected in any suitable manner, provided that the slurry-treated substrate obtained from (a) is dried to some extent. It is preferred that the drying is effected to remove between 85% and 95% of moisture. Thus, it is preferred according to the present invention that a gas atmosphere is used for heat exchange to this effect. As regards the gas atmosphere for the drying in (b), no particular restrictions apply such that any gas may be used, provided that the gas is suitable for providing a gas atmosphere at a temperature useful for heat exchange. Thus, by way of example, the gas atmosphere may comprise one or more of nitrogen, oxygen, an inert gas and carbon dioxide, preferably nitrogen. Alternatively, the gas atmosphere may comprise air.

As regards the temperature of the gas atmosphere for drying in (b), no particular restriction applies such that any suitable temperature may be chosen provided that the slurry-treated substrate obtained in (a) may be dried to a certain extent, resulting in a dried slurry-treated substrate. Thus, by way of example, drying in (b), may be effected using a gas atmosphere having a temperature in the range of from 90 to 170° C., preferably of from 100 to 140° C., and more preferably of from 110 to 130° C.

As regards the calcining in (c), no restrictions apply such that the calcining may be effected in any suitable manner, provided that the dried slurry-treated substrate is calcined to some extent, and provided that the calcining results in a substrate having a first layer disposed thereon. However, it is preferred according to the present invention that a gas atmosphere is used for heat exchange to this effect. As regards the gas atmosphere for the calcining in (c) the same applies as for the gas atmosphere for the drying, such that in principle any gas may be used, provided that the gas is suitable for providing a gas atmosphere at a temperature useful for calcining. Thus, by way of example, the gas atmosphere may comprise one or more of nitrogen, oxygen, an inert gas and carbon dioxide, preferably nitrogen.

As regards the temperature of the gas atmosphere for calcining in (c) any suitable temperature may be chosen in principle, provided that the dried slurry-treated substrate obtained from one or more of (b) may be effectively calcined. Thus, by way of example, calcining in (c) may be effected using a gas atmosphere having a temperature in the range of from 350 to 550° C., preferably of from 400 to 500° C., more preferably of from 440 to 460° C.

As mentioned above in view of the process for preparing the catalyst of any of the particular and preferred embodiments defined in the present application, it is preferred that the one or more slurries comprise one or more of a first slurry, a second slurry and a third slurry. Thus, it is preferred that the one or more slurries comprise a first slurry and a second slurry.

Therefore, the process for preparing the catalyst of any of the particular and preferred embodiments defined in the present application further comprises (d) disposing a second slurry on the substrate having a first layer disposed thereon, obtaining a slurry-treated substrate,
(e) drying the slurry-treated substrate obtained from (d),
(f) calcining the dried slurry-treated substrate obtained from (e), obtaining the substrate having a first and a second layer disposed thereon.

As regards the first slurry in the process comprising (a) to (f), preferably according to any of the particular and preferred embodiments as defined herein, the first slurry may comprise the one or more of an oxidic compound of V, an oxidic compound of W, a zeolitic material comprising one or more of Cu and Fe and the platinum group metal supported on a metal oxide support material. As regards the second slurry in the process comprising (a) to (f), the second slurry may comprise the one or more of an oxidic compound of V, an oxidic compound of W, a zeolitic material comprising one or more of Cu and Fe and the platinum group metal supported on a metal oxide support material.

As a first alternative, the first slurry comprises the one or more of an oxidic compound of V, an oxidic compound of W and a zeolitic material comprising one or more of Cu and Fe, and the second slurry comprises the platinum group metal supported on a metal oxide support material.

As a second alternative, the first slurry comprises the platinum group metal supported on a metal oxide support material and the second slurry comprises the one or more of an oxidic compound of V, an oxidic compound of W and a zeolitic material comprising one or more of Cu and Fe.

When the one or more slurries comprise a first and a second slurry, there is no restriction with regard to the order in which the first slurry and the second slurry are disposed on the substrate as long as the first slurry and the second slurry are provided on the substrate. Thus, by way of example, the first slurry or the second slurry may be directly disposed on the substrate, wherein it is preferred that the first slurry is directly disposed on the substrate. As regards the second slurry, it is thus particularly preferred that the second slurry is disposed at least partially, preferably completely, on the first slurry. Alternatively, the first slurry may be disposed on the second slurry in the case where the second slurry is disposed on the substrate.

When the one or more slurries comprise a first and a second slurry, with respect to disposing the first and the second slurry on the substrate, wherein the substrate is as defined herein, in particular having a plurality of longitudinally extending passages formed by longitudinally extending walls bounding and defining the passages and a longitudinal total length extending between a front end and a rear end of the substrate, the disposing of the first slurry may be effected on any length relative to the total length of the substrate. It is thus conceivable to effect the disposing of the first slurry from either the front end or the rear end. Thus, by way of example, disposing the first slurry on the substrate may be effected on 25 to 100%, preferably on 50 to 100%, more preferably on 75 to 100%, more preferably on 90 to 100%, more preferably on 95 to 100%, more preferably on 100% of the total length of the substrate, preferably from the front end of the substrate. According to a particularly preferred embodiment, the first slurry is directly disposed on the substrate, and the second slurry is disposed completely on the first slurry, wherein the disposing of the first slurry is effected on 25 to 100%, preferably on 50 to 100%, more preferably on 75 to 100%, more preferably on 90 to 100%, more preferably on 95 to 100%, more preferably on 100% of the total length of the substrate, preferably from the front end of the substrate.

When the one or more slurries comprise a first and a second slurry, it is conceivable to effect disposing of the second slurry on any length of the substrate relative to the total length of the substrate. It is thus preferred that the substrate is as defined herein, thus having a substrate length and a front end and a rear end. Accordingly, disposing the second slurry may be effected either from the front end or from the rear end. Thus, by way of example, the second slurry may be disposed on 25 to 75%, preferably on 35 to 65%, more preferably on 45 to 55%, more preferably on 50% of the total length of the substrate, preferably from the rear end of the substrate.

As regards the drying in (e), the same applies as with respect to the drying in (b) as defined herein. As regards, the calcining in (f), the same applies as with respect to the calcining in (c) as defined herein.

As mentioned above in view of the process for preparing the catalyst of any of the particular and preferred embodiments defined in the present application, it is preferred that the one or more slurries comprise one or more of a first slurry, a second slurry and a third slurry. Thus, it is preferred that the one or more slurries comprise a first slurry, a second slurry and a third slurry.

Therefore, the process for preparing the catalyst of any of the particular and preferred embodiments defined in the present application further comprises (g) disposing a third slurry on the substrate having a first and a second layer disposed thereon, obtaining a slurry-treated substrate,
(h) drying the slurry-treated substrate obtained from (g),
(k) calcining the dried slurry-treated substrate obtained from (h), obtaining the substrate having a third layer disposed thereon.

As regards the third slurry in the process comprising (a) to (k), preferably according to any of the particular and preferred embodiments as defined herein, the third slurry may comprise one or more of an oxidic compound of V, an oxidic compound of W, a zeolitic material comprising one or more of Cu and Fe and a platinum group metal supported on a metal oxide support material as defined herein. However, it is preferred that the third slurry comprises one or more of an oxidic compound of V, an oxidic compound of W and a zeolitic material comprising one or more of Cu and Fe as defined herein.

When the one or more slurries comprise a first, a second and a third slurry, there is no restriction in which order the first slurry, the second slurry and the third slurry are disposed on the substrate. Thus, by way of example the first or the second slurry may be directly disposed on the substrate, wherein it is preferred that the first slurry is directly disposed on the substrate resulting in a first layer. As regards the second slurry, it is thus particularly preferred that the second slurry is disposed at least partially, preferably completely, on the substrate as well resulting in a second layer. As regards the third slurry, it is conceivable that the third slurry is disposed at least partially on the first layer or on the second layer, preferably at least partially on the second layer.

When the one or more slurries comprise a first, a second and a third slurry and under the condition that the substrate is preferably as defined herein, thus having a plurality of longitudinally extending passages formed by longitudinally extending walls bounding and defining the passages and a longitudinal total length extending between a front end and a rear end of the substrate, it is preferred that disposing the first slurry is effected on any length of the total length of the substrate from the front end of the substrate, disposing the second slurry is effected on any length of the total length of the substrate from the rear end of the substrate and disposing the third slurry is effected on any length of the total length of the substrate, preferably from the rear end of the substrate.

When the one or more slurries comprise a first, a second and a third slurry, in accordance with any of the particular and preferred embodiments of the process and under the condition that the substrate is preferably as defined herein, thus having a plurality of longitudinally extending passages formed by longitudinally extending walls bounding and defining the passages and a longitudinal total length extending between a front end and a rear end of the substrate, disposing the first slurry is effected on 25 to 75%, preferably on 35 to 65%, more preferably on 45 to 55% of the total length of the substrate from the front end of the substrate, disposing the second slurry is effected on 25 to 75%, preferably on 35 to 65%, more preferably on 45 to 55% of the total length of the substrate from the rear end of the substrate and disposing the third slurry is effected on 25 to 75%, preferably on 35 to 65%, more preferably on 45 to 55% of the total length of the substrate, preferably from the rear end of the substrate.

When the one or more slurries comprise a first, a second and a third slurry and in accordance with any of the particular and preferred embodiments of the process comprising (a) to (k), it is particularly preferred that the third slurry is disposed on the second layer, preferably over the same length as the second layer.

As regards the first slurry, the second slurry and the third slurry in the process according to any of the particular and preferred embodiments of the process as defined herein, it is preferred that the first slurry, the second slurry and the third slurry further comprises a liquid component. Thus, there is no restriction as regards the liquid component, provided that it allows for homogenizing one or more of the first slurry, the second slurry and the third slurry. It is preferred that the first slurry, the second slurry and the third slurry further comprises, as liquid component, one or more of water, methanol, ethanol, isopropanol, n-propanol, formic acid, acetic acid and propionic acid, preferably one or more of water and acetic acid, more preferably water.

Furthermore, as regards the first slurry, the second slurry and the third slurry in the process according to any of the particular and preferred embodiments as defined herein, it is preferred that the first slurry, the second slurry and the third slurry further comprises one or more of zirconyl-acetate, a silicate, silica, an aluminate, alumina, a titanate and titania, preferably zirconyl-acetate.

As regards the drying in (h), the same applies as with respect to the drying in (b) as defined herein.

As regards the calcining in (k), the same applies as with respect to the calcining in (c) as defined herein.

As regards the method for disposing one or more of the first slurry, the second slurry and the third slurry, no restriction applies such that any suitable method may be applied to this effect, provided that a slurry-treated substrate is obtained accordingly. However, it is preferred according to the present invention that disposing one or more of the first slurry, the second slurry and the third slurry is effected by wet impregnation or spraying, preferably by wet impregnation.

As regards the value of the loading of the zeolitic material comprising one or more of Cu and Fe, the loading of the platinum group metal supported on a support a metal and the loading of the metal oxide binder material on the substrate expressed in grams per cubic inch, it is noted that within the meaning of the present invention the weight in grams refers to the weight of the zeolitic material containing a metal and the volume expressed in cubic inches refers to the volume of the substrate and preferably of the uncoated substrate, wherein said volume includes any pores, cavities, and channels which may be present in the substrate form. In particular, in particularly preferred instances wherein a honeycomb monolith substrate is employed, the volume refers to the total volume of the honeycomb substrate including the channels contained therein.

The wording "substantially free of" as disclosed herein characterizes a subject-matter in that it contains less than 0.1 weight-%, preferably less than 0.01 weight-%, more preferably less than 0.001 weight-% of a designated substance, element or group of elements of the periodic table of elements.

The units inch (abbreviated as in) and foot (abbreviated as ft) as disclosed herein refer to units of length in the imperial and United States customary systems of measurements. There are 12 inches in a foot. One inch is equal to 2.54 cm.

The present invention is further illustrated by the following set of embodiments and combinations of embodiments resulting from the dependencies and back-references as indicated. In particular, it is noted that in each instance where a range of embodiments is mentioned, for example in the context of a term such as "The process of any one of embodiments 1 to 4", every embodiment in this range is meant to be explicitly disclosed for the skilled person, i.e. the wording of this term is to be understood by the skilled person as being synonymous to "The process of any one of embodiments 1, 2, 3, and 4".

1. A catalyst, preferably for the selective catalytic reduction of $NO_x$, for the oxidation of ammonia, for the oxidation of NO and for the oxidation of a hydrocarbon, comprising a washcoat comprising one or more layers, the washcoat being disposed on a substrate, wherein the washcoat comprises
    (i) a platinum group metal supported on a metal oxide support material, and
    (ii) one or more of an oxidic compound of V, an oxidic compound of W, and a zeolitic material comprising one or more of Cu and Fe, wherein the washcoat preferably comprises
    (i) a platinum group metal supported on a metal oxide support material, and
    (ii) a zeolitic material comprising one or more of Cu and Fe.

2. The catalyst of embodiment 1, wherein the platinum group metal is one or more of Pt, Pd and Rh, preferably one or more of Pt and Pd, more preferably Pt.

3. The catalyst of embodiment 1 or 2, wherein the metal oxide support material is one or more of alumina, zirconia-alumina, silica-alumina, titania, zirconia-titania and ceria, preferably one or more of alumina, silica-alumina and zirconia-alumina, more preferably zirconia-alumina.

4. The catalyst of any one of embodiments 1 to 3, wherein the framework structure of the zeolitic material comprises a tetravalent element Y which is one or more of Si, Sn, Ti, Zr and Ge, preferably Si.

5. The catalyst of any one of embodiments 1 to 4, wherein the framework structure of the zeolitic material comprises a trivalent element X which is one or more of B, Al, Ga and In, preferably Al.

6. The catalyst of any one of embodiments 1 to 5, wherein the zeolitic material has a framework structure of the type ABW, ACO, AEI, AEL, AEN, AET, AFG, AFI, AFN, AFO, AFR, AFS, AFT, AFV, AFX, AFY, AHT, ANA, APC, APD, AST, ASV, ATN, ATO, ATS, ATT, ATV, AVL, AWO, AWW, BCT, BEA, BEC, BIK, BOF, BOG, BOZ, BPH, BRE, BSV, CAN, CAS, CDO, CFI, CGF, CGS, CHA, -CHI, -CLO, CON, CSV, CZP, DAC, DDR, DFO, DFT, DOH, DON, EAB, EDI, EEI, EMT, EON, EPI, ERI, ESV, ETR, EUO, *-EWT, EZT, FAR, FAU, FER, FRA, GIS, GIU, GME, GON, GOO, HEU, IFO, IFR, -IFU, IFW, IFY, IHW, IMF, IRN, IRR, -IRY, ISV, ITE, ITG, ITH, *-ITN, ITR, ITT, -ITV, ITW, IWR, IWS, IWV, IWW, JBW, JNT, JOZ, JRY, JSN, JSR, JST, JSW, KFI, LAU, LEV, LIO, -LIT, LOS, LOV, LTA, LTF, LTJ, LTL, LTN, MAR, MAZ, MEI, MEL, MEP, MER, MFI, MFS, MON, MOR, MOZ, *MRE, MSE, MSO, MTF, MTN, MTT, MTW, MVY, MWF, MWW, NAB, NAT, NES, NON, NPO, NPT, NSI, OBW, OFF, OKO, OSI, OSO, OWE, -PAR, PAU, PCR, PHI, PON, POS, PSI, PUN, RHO, -RON, RRO, RSN, RTE, RTH, RUT, RWR, RWY, SAF, SAO, SAS, SAT, SAV, SBE, SBN, SBS, SBT, SEW, SFE, SFF, SFG, SFH, SFN, SFO, SFS, *SFV, SFW, SGT, SIV, SOD, SOF, SOS, SSF, *-SSO, SSY, STF, STI, *STO, STT, STW, -SVR, SW, SZR, TER, THO, TOL, TON, TSC, TUN, UEI, UFI, UOS, UOV, UOZ, USI, UTL, UWY, VET, VFI, VNI, VSV, WEI, -WEN, YUG, ZON, mixtures of two or more thereof, and mixed types of two or more thereof, preferably of the type AEI, GME, BEA, CHA, FAU, FER, HEU, LEV, MEI, MEL, MFI, or MOR, more preferably of the type AEI, GME, CHA, MFI, BEA, FAU, or MOR, more preferably of the type CHA, AEI, or BEA, more preferably of the type CHA and/or AEI, and more preferably of the type CHA.

7. The catalyst of any one of embodiments 1 to 6, wherein the framework structure of the zeolitic material comprises Si, Al, 0 and H, and wherein at least 99.0 weight-%, preferably at least 99.5 weight-%, more preferably at least 99.9 weight-% of the framework structure of the zeolitic material consist of Si, Al, 0 and H.

8. The catalyst of any one of embodiments 1 to 7, wherein the oxidic compound of V is one or more of an ammonium vanadate, a sodium vanadate, an iron vanadate, vanadium pentoxide and vanadium pentoxide stabilized with ferric oxide.

9. The catalyst of any one of embodiments 1 to 8, wherein the oxidic compound of W is one or more of an ammonium tungstate, a sodium tungstate and tungsten trioxide.

10. The catalyst of any one of embodiments 1 to 9, wherein one or more of the oxidic compound of V and the oxidic compound of W is supported on one or more of titania and zirconia-titania, preferably on titania.

11. The catalyst of any one of embodiments 1 to 10, wherein the zeolitic material comprises Cu.

12. The catalyst of any one of embodiments 1 to 11, wherein the framework structure of the zeolitic material comprises Si and Al and the zeolitic material comprises Cu.

13. The catalyst of any one of embodiments 1 to 12, wherein the zeolitic material comprises Si, Al, O, H and Cu, and wherein at least 99.0 weight-%, preferably at least 99.5 weight-%, more preferably at least 99.9 weight-% of the framework structure of the zeolitic material consist of Si, Al, O, H and Cu.

14. The catalyst of any one of embodiments 1 to 13, wherein the zeolitic material comprises Cu, calculated as CuO, respectively, in an amount in the range of from 0.1 to 5 weight-%, preferably of from 1.0 to 4.5 weight-%, more preferably of from 2 to 4 weight-%, more preferably of from 2.5 to 3.5 weight-%, more preferably of from 3 to 3.5 weight-%, based on the total weight of the zeolitic material.

15. The catalyst of any one of embodiments 1 to 14, wherein the zeolitic material comprises Fe.

16. The catalyst of any one of embodiments 1 to 15, wherein the framework structure of the zeolitic material comprises Si and Al and the zeolitic material comprises Fe.

17. The catalyst of any one of embodiments 1 to 16, wherein the zeolitic material comprises Si, Al, O, H and Fe, and wherein at least 99.0 weight-%, preferably at least 99.5 weight-%, more preferably at least 99.9 weight-% of the zeolitic material consist of Si, Al, 0, H and Fe.

18. The catalyst of any one of embodiments 1 to 17, wherein the zeolitic material comprises Fe, calculated as $Fe_2O_3$, respectively, in an amount in the range of from 0.1 to 5 weight-%, preferably of from 1.0 to 4.5 weight-%, more preferably of from 2 to 4 weight-%, more preferably of from 3 to 3.5 weight-%, based on the total weight of the zeolitic material.

19. The catalyst of any one of embodiments 1 to 18, wherein the washcoat additionally comprises
   (iii) a metal oxide binder material.

20. The catalyst of embodiment 19, wherein the metal oxide binder material is one or more of zirconia, alumina, silica, titania, silica-zirconia and zirconia-titania, preferably one or more of zirconia and zirconia-titania, more preferably zirconia.

21. The catalyst of any one of embodiments 1 to 20, wherein the substrate comprises a ceramic and/or a metallic substance, preferably a ceramic substance, more preferably a ceramic substance which is one or more of alumina, silica, silicates, aluminosilicates, aluminotitanates, silicon carbide, cordierite, mullite, zirconia, spinel, magnesia, and titania, more preferably one or more of alpha-alumina, aluminotitanates, silicon carbide, and cordierite, more preferably one or more of $Al_2TiO_5$, SiC, and cordierite, wherein more preferably the substrate comprises cordierite, wherein more preferably the substrate consists of cordierite.

22. The catalyst of any one of embodiments 1 to 21, wherein the substrate is one or more of a granule, a pellet, a mesh, a ring, a sphere, a cylinder, a hollow cylinder and a monolith, wherein the substrate is preferably a monolith, more preferably a honeycomb monolith, wherein the honeycomb monolith is preferably a wall-flow or flow-through monolith, preferably a flow-through monolith.

23. The catalyst of any one of embodiments 1 to 22, wherein the substrate has a plurality of longitudinally extending passages formed by longitudinally extending walls bounding and defining the passages and a longitudinal total length extending between a front end and a rear end of the substrate.

24. The catalyst of any one of embodiments 1 to 23, wherein the washcoat consists of one layer.

25. The catalyst of embodiment 24, wherein the substrate has a substrate length and wherein the one layer is disposed on 50 to 100%, preferably on 75 to 100%, more preferably on 95 to 100%, more preferably on 100% of the total length of the substrate.

26. The catalyst of embodiment 24 or 25, wherein the one layer comprises the platinum group metal at a loading in the range of from 1 to 15 $g/ft^3$, preferably of from 3 to 10 $g/ft^3$, more preferably of from 4.5 to 8.5 $g/ft^3$, more preferably of from 5.5 to 8.5 $g/ft^3$, more preferably of from 7.5 to 8.5 $g/ft^3$.

27. The catalyst of any one of embodiments 24 to 26, wherein the one layer comprises the zeolitic material at a loading in the range of from 1.0 to 4.5 $g/in^3$, preferably of from 1.5 to 4.0 $g/in^3$, more preferably of from 2.0 to 3.75 $g/in^3$, more preferably of from 2.75 to 3.5 $g/in^3$.

28. The catalyst of any one of embodiments 24 to 27, wherein the catalyst consists of the washcoat disposed on the substrate.

29. The catalyst of any one of embodiments 1 to 23, wherein the washcoat comprises a first and a second layer.

30. The catalyst of embodiment 29, wherein the first layer comprises one or more of the oxidic compound of V, the oxidic compound of W and the zeolitic material comprising one or more of Cu and Fe.

31. The catalyst of embodiment 30, wherein the first layer comprises the zeolitic material at a loading in the range of from 1.5 to 4.0 $g/in^3$, preferably of from 2.0 to 4.0 $g/in^3$, more preferably of from 2.0 to 3.5 $g/in^3$, more preferably of from 3.0 to 3.5 $g/in^3$.

32. The catalyst of embodiment 30 or 31, wherein the first layer further comprises the metal oxide binder material as defined in embodiment 19 or 20.

33. The catalyst of embodiment 32, wherein the first layer comprises the metal oxide binder material at a loading in the range of from 0.02 to 0.25 $g/in^3$, preferably of from 0.07 to 0.25 $g/in^3$, more preferably of from 0.1 to 0.25 $g/in^3$, more preferably of from 0.2 to 0.25 $g/in^3$.

34. The catalyst of any one of embodiments 30 to 33, wherein the first layer does not comprise the platinum group metal supported on the metal oxide support material.

35. The catalyst of any one of embodiments 30 to 34, wherein the first layer consists of one or more of the oxidic compound of V, the oxidic compound of W and the zeolitic material comprising one or more of Cu and Fe and preferably the metal oxide binder material.

36. The catalyst of any one of embodiments 29 to 35, wherein the second layer comprises the platinum group metal supported on the metal oxide support material.

37. The catalyst of embodiment 36, wherein the second layer comprises the platinum group metal at a loading in the range of from 2 to 30 g/ft³, preferably of from 6 to 20 g/ft³, more preferably 9.5 to 17 g/ft³, more preferably 11 to 17 g/ft³.

38. The catalyst of embodiment 36 or 37, wherein the second layer does not comprise the oxidic compound of V, the oxidic compound of W and the zeolitic material comprising one or more of Cu and Fe.
39. The catalyst of any one of embodiments 36 to 38, wherein the second layer does not comprise the metal oxide binder material as defined in embodiment 19 or 20.
40. The catalyst of any one of embodiments 36 to 39, wherein the second layer consists of the platinum group metal supported on the metal oxide support material.
41. The catalyst of any one of embodiment 29 to 40, wherein the first layer is disposed on the substrate, or wherein the second layer is disposed on the substrate.
42. The catalyst of any one of embodiment 29 to 41, wherein the first layer is disposed on the substrate and the second layer is at least partially disposed on the first layer, or wherein the second layer is disposed on the substrate and the first layer is at least partially disposed on the second layer.
43. The catalyst of any one of embodiment 29 to 42, wherein the first layer is disposed on the substrate and the second layer is completely disposed on the first layer, or wherein the second layer is disposed on the substrate and the first layer is completely disposed on the second layer.
44. The catalyst of any one of embodiments 29 to 43, preferably of any one embodiment 41 to 43, more preferably of embodiment 43, wherein the substrate is as defined in embodiment 23, and
    wherein the first layer is disposed on 25 to 100%, preferably on 50 to 100%, more preferably on 75 to 100%, more preferably on 90 to 100%, more preferably on 95 to 100%, more preferably on 100% of the total length of the substrate, preferably from the front end of the substrate,
    or wherein the second layer is disposed on 25 to 100%, preferably on 50 to 100%, more preferably on 75 to 100%, more preferably on 90 to 100%, more preferably on 95 to 100%, more preferably on 100% of the total length of the substrate, preferably from the front end of the substrate.
45. The catalyst of any one of embodiments 29 to 44, preferably of embodiment 44, wherein the substrate is as defined in embodiment 23, and
    wherein the second layer is disposed on 25 to 75%, preferably on 35 to 65%, more preferably on 45 to 55%, more preferably on 50% of the total length of the substrate, preferably from the rear end of the substrate,
    or wherein the first layer is disposed on 50 to 100%, preferably on 75 to 100%, more preferably on 95 to 100%, more preferably on 100% of the total length of the substrate, preferably from the rear end of the substrate.
46. The catalyst of any one of embodiments 29 to 45, wherein the washcoat consists of the first and the second layer.
47. The catalyst of any one of embodiments 29 to 45, wherein the washcoat further comprises a third layer.
48. The catalyst of embodiment 47, wherein the third layer further comprises one or more of an oxidic compound of V, an oxidic compound of W and a zeolitic material comprising one or more of Cu and Fe.
49. The catalyst of embodiment 48, wherein the third layer comprises the zeolitic material at a loading in the range of from 0.2 to 0.8 g/in³, preferably of from 0.3 to 0.7 g/in³, more preferably of from 0.4 to 0.6 g/in³.
50. The catalyst of any one of embodiments 47 to 49, wherein the substrate is as defined in embodiment 23, and wherein the third layer is disposed on 25 to 75%, preferably on 35 to 65%, more preferably on 45 to 55% of the total length of the substrate, preferably from the rear end of the substrate.
51. The catalyst of any one of embodiments 47 to 50, wherein the first layer is disposed on 25 to 75%, preferably on 35 to 65%, more preferably on 45 to 55% of the total length of the substrate from the front end of the substrate and the second layer is disposed on 25 to 75%, preferably on 35 to 65%, more preferably on 45 to 55% of the total length of the substrate from the rear end of the substrate, wherein the first and the second layer in total are preferably disposed on 100% of the total length of the substrate.
52. The catalyst of embodiment 51, wherein the third layer is disposed on the second layer.
53. The catalyst of embodiment 52, wherein the third layer has the same length as the second layer.
54. The catalyst of any one of embodiments 47 to 53, wherein the washcoat consists of the first, the second and the third layer.
55. The catalyst of any one of embodiments 1 to 54, being comprised, as a second catalyst, in a sequence of two or more catalysts, preferably of two catalysts, wherein a first catalyst is comprised in said sequence, wherein the substrate of the first catalyst is preferably as defined in any one of embodiments 18 to 20, more preferably as being of the same chemical structure as the substrate of the second catalyst, more preferably being identical with the substrate of the second catalyst, wherein the first catalyst comprises a washcoat layer comprising one or more of an oxidic compound of V, an oxidic compound of W, and a zeolitic material comprising one or more of Cu and Fe, wherein the one or more of an oxidic compound of V, an oxidic compound of W, and a zeolitic material comprising one or more of Cu and Fe is preferably as defined in any one of embodiments 8 to 17.
56. The catalyst of embodiment 55, wherein the first catalyst comprises one or more of a zeolitic material comprising one or more of Cu and Fe, preferably a zeolitic material comprising Cu, wherein the one or more of a zeolitic material comprising one or more of Cu and Fe is preferably as defined in any one of embodiments 8 to 17, wherein more preferably, the first catalyst comprises, more preferably is, a catalyst for the selective catalytic reduction of $NO_x$.
57. The catalyst of any one of embodiments 1 to 56 for use in a process for an exhaust gas treatment as a tetrafunctional catalyst for the simultaneous selective catalytic reduction of $NO_x$, the oxidation of ammonia, the oxidation of nitrogen monoxide and the oxidation of a hydrocarbon.
58. Use of the catalyst of any one of embodiments 1 to 56 for the simultaneous selective catalytic reduction of $NO_x$, the oxidation of ammonia, the oxidation of nitrogen monoxide and the oxidation of a hydrocarbon, preferably in a treatment of an exhaust gas.
59. Use of the catalyst of any one of embodiments 1 to 56 for the treatment of an exhaust gas, preferably for the treatment of an industrial or an automotive exhaust gas, more preferably for the treatment of an automotive exhaust gas.

60. The use of embodiment 59, wherein the automotive exhaust gas is an exhaust gas of an internal combustion engine, preferably a diesel engine, more preferably a heavy-duty diesel engine.

61. A method for the simultaneous selective catalytic reduction of $NO_x$, the oxidation of ammonia, the oxidation of nitrogen monoxide and the oxidation of a hydrocarbon, preferably in a treatment of an exhaust gas, using a catalyst of any one of embodiments 1 to 56.

62. A method for the treatment of an exhaust gas, preferably for the treatment of an industrial or an automotive exhaust gas, more preferably for the treatment of an automotive exhaust gas, using a catalyst of any one of embodiments 1 to 56.

63. The method of embodiment 62, wherein the automotive exhaust gas is an exhaust gas of an internal combustion engine, preferably a diesel engine, more preferably a heavy-duty diesel engine.

64. The catalyst of any one of embodiments 1 to 56, wherein the catalyst is comprised in an exhaust gas treatment system which is preferably in fluid communication with an internal combustion engine, preferably a diesel engine, more preferably a heavy-duty diesel engine.

65. An exhaust gas treatment system, preferably in fluid communication with an internal combustion engine, said exhaust gas system comprising the catalyst of any one of embodiments 1 to 56, wherein the internal combustion engine is preferably a diesel engine, more preferably a heavy-duty diesel engine.

66. The exhaust gas treatment system of embodiment 65, comprising
    a first reductant injector,
    a first catalyst for the selective catalytic reduction of $NO_x$, preferably the first catalyst as defined in embodiment 55 or 56,
    a second catalyst, wherein said second catalyst is the catalyst of any one of embodiments 1 to 56;
    a catalyzed soot filter,
    a second reductant injector,
    a third catalyst for the selective catalytic reduction of $NO_x$, and
    a fourth catalyst for the selective catalytic reduction of $NO_x$ and/or for the oxidation of ammonia.

67. The exhaust gas treatment system of embodiment 66, wherein the first catalyst is located upstream of the second catalyst, the second catalyst is located upstream of the third catalyst, and the third catalyst is located upstream of the fourth catalyst.

68. The exhaust gas treatment system of embodiment 66 or 67, wherein the first reductant injector is located upstream of the first catalyst.

69. The exhaust gas treatment system of any one of embodiments 66 to 68, wherein the second reductant injector is located downstream of the catalyzed soot filter and upstream of the third catalyst.

70. The exhaust gas treatment system of any one of embodiments 66 to 69, which contains no diesel oxidation catalyst located downstream of the second catalyst and upstream of the catalyzed soot filter, preferably no diesel oxidation catalyst located upstream of the catalyzed soot filter, wherein more preferably, the exhaust gas treatment system contains no diesel oxidation catalyst.

71. The exhaust gas treatment system of any one of embodiments 66 to 70, which contains no further catalyst and which contains no further reductant injector.

72. The exhaust gas treatment system of any one of embodiments 66 to 71, wherein the first reductant injector is a urea injector.

73. The exhaust gas treatment system of any one of embodiments 66 to 72, wherein the second reductant injector is a urea injector.

74. The exhaust gas treatment system of any one of embodiments 66 to 73, wherein the first catalyst is close coupled to the internal combustion engine, preferably located directly downstream of the internal combustion engine.

75. A method for the simultaneous selective catalytic reduction of $NO_x$, the oxidation of ammonia, the oxidation of nitrogen monoxide and the oxidation of a hydrocarbon, comprising
    (1) providing a gas stream comprising one or more of $NO_x$, ammonia, nitrogen monoxide and a hydrocarbon;
    (2) contacting the gas stream provided in (1) with the catalyst of any one of embodiments 1 to 56.

76. The method of embodiment 75, wherein the gas stream is an exhaust gas stream from an internal combustion engine, preferably a diesel engine, more preferably a heavy-duty diesel engine.

77. The method of embodiment 75 or 76, wherein the catalyst of any one of embodiments 1 to 56 according to (2) is comprised in an exhaust gas treatment system according to any one of embodiments 65 to 74.

78. The method of embodiment 75 or 76, wherein for contacting the gas stream with the catalyst of any one of embodiments 1 to 56 according to (2), the gas stream is introduced in an exhaust gas treatment system according to any one of embodiments 65 to 74.

79. A method for the simultaneous selective catalytic reduction of $NO_x$, the oxidation of ammonia, the oxidation of nitrogen monoxide and the oxidation of a hydrocarbon, comprising
    (1) providing a gas stream comprising one or more of $NO_x$, ammonia, nitrogen monoxide and a hydrocarbon;
    (2) introducing the gas stream into an the exhaust gas treatment system according to any one of embodiments 65 to 74 and passing the gas stream through the system.

80. A process for preparing the catalyst of any one of embodiments 1 to 56, the process comprising disposing one or more slurries on a substrate, the one or more slurries comprising the platinum group metal supported on a metal oxide support material and one or more of the oxidic compound of V, the oxidic compound of W and the zeolitic material comprising one or more of Cu and Fe, wherein, after having disposed a slurry on the substrate, a slurry-treated substrate is obtained which is dried and calcined.

81. The process of embodiment 80, comprising
    (a) disposing a first slurry on a substrate, obtaining a slurry-treated substrate;
    (b) drying the slurry-treated substrate obtained from (a),
    (c) calcining the dried slurry-treated substrate obtained from (b), obtaining the substrate having a first layer disposed thereon.

82. The process of embodiment 81, wherein the first slurry comprises the platinum group metal supported on a metal oxide support material and one or more of the oxidic compound of V, the oxidic compound of W and the zeolitic material comprising one or more of Cu and Fe, wherein the first slurry preferably further comprises a disposing adjuvant, preferably one or more of tartaric acid and monoethanolamine, more preferably tartaric acid and monoethanolamine.

83. The process of embodiment 82, wherein the substrate has a substrate length, the process comprising disposing the first slurry on 50 to 100%, preferably on 75 to 100%, more preferably on 95 to 100%, more preferably on 100% of the total length of the substrate.

84. The process of embodiment 81, further comprising
    (d) disposing a second slurry on the substrate having a first layer disposed thereon, obtaining a slurry-treated substrate,
    (e) drying the slurry-treated substrate obtained from (d),
    (f) calcining the dried slurry-treated substrate obtained from (e), obtaining the substrate having a first and a second layer disposed thereon.

85. The process of embodiment 84, wherein the first slurry comprises one or more of the oxidic compound of V, the oxidic compound of W and the zeolitic material comprising one or more of Cu and Fe, and wherein the second slurry comprises the platinum group metal supported on a metal oxide support material,
    or wherein the first slurry comprises the platinum group metal supported on a metal oxide support material and the second slurry comprises one or more of the oxidic compound of V, the oxidic compound of W and the zeolitic material comprising one or more of Cu and Fe.

86. The process of embodiment 84 or 85, comprising disposing the first slurry directly on the substrate and disposing the second slurry completely on the first layer.

87. The process of any one of embodiments 84 to 86, preferably of embodiment 76, wherein the substrate is as defined in embodiment 23, the process comprising disposing the first slurry on 25 to 100%, preferably on 50 to 100%, more preferably on 75 to 100%, more preferably on 90 to 100%, more preferably on 95 to 100%, more preferably on 100% of the total length of the substrate, preferably from the front end of the substrate.

88. The process of any one of embodiments 84 to 87, preferably of embodiment 87, wherein the substrate is as defined in embodiment 23, the process comprising disposing the second slurry on 25 to 75%, preferably on 35 to 65%, more preferably on 45 to 55%, more preferably on 50% of the total length of the substrate, preferably from the rear end of the substrate.

89. The process of any one of embodiments 84 to 88, further comprising
    (g) disposing a third slurry on the substrate having a first and a second layer disposed thereon, obtaining a slurry-treated substrate,
    (h) drying the slurry-treated substrate obtained from (g),
    (k) calcining the dried slurry-treated substrate obtained from (h), obtaining the substrate having a third layer disposed thereon.

90. The process of embodiment 89, wherein the third slurry comprises one or more of an oxidic compound of V, an oxidic compound of W and a zeolitic material comprising one or more of Cu and Fe.

91. The process of embodiment 89 or 90, wherein the substrate is as defined in embodiment 23, the process further comprising disposing the first slurry on 25 to 75%, preferably on 35 to 65%, more preferably on 45 to 55% of the total length of the substrate from the front end of the substrate, disposing the second slurry on 25 to 75%, preferably on 35 to 65%, more preferably on 45 to 55% of the total length of the substrate from the rear end of the substrate and disposing the third slurry on 25 to 75%, preferably on 35 to 65%, more preferably on 45 to 55% of the total length of the substrate, preferably from the rear end of the substrate.

92. The process of embodiment 91, comprising disposing the third slurry on the second layer, preferably over the same length as the second layer.

93. The process of any one of embodiments 81 to 92, wherein one or more of the first slurry of embodiment 81, the first slurry of embodiment 84, the second slurry and the third slurry further comprises, as liquid component, one or more of water, methanol, ethanol, isopropanol, n-propanol, formic acid, acetic acid and propionic acid, preferably one or more of water and acetic acid, more preferably water.

94. The process of any one of embodiments 81 to 93, wherein one or more of the first slurry of embodiment 81, the first slurry of embodiment 84 and the third slurry further comprises one or more of zirconyl-acetate, a silicate, silica, an aluminate, alumina, a titanate and titanic, preferably zirconyl-acetate.

95. The process of any one of embodiments 81 to 94, wherein the drying according to one or more of (b), (e) and (h) is effected using a gas atmosphere having a temperature in the range of from 90 to 170° C. preferably of from 100 to 140° C., and more preferably of from 110 to 130° C.

96. The process of any one of embodiments 81 to 95, wherein the calcining according to one or more of (c), (f) and (k) is effected using a gas atmosphere having a temperature in the range of from 350 to 550° C., preferably of from 400 to 500° C., more preferably of from 440 to 460° C.

97. The process of any one of embodiments 81 to 96, comprising disposing one or more of the first slurry, the second slurry and the third slurry by wet impregnation or spraying, preferably by wet impregnation.

The present invention is further illustrated by the following examples and reference examples.

EXAMPLES

Reference Example 1: Determination of the D90 Values

The D90 particle size as referred to in the context of the present invention was measured with a Sympatec Particle Size instrument using laser diffraction (Sympatec's HELOS system allowing the determination of the particle size distribution in the range of from 0.1 to 8,750 micrometer). According to this method, the particle size distribution was evaluated with a parameter-free and model-independent mathematical algorithm, accomplished by the introduction of the Phillips-Twomey algorithm for the inversion process.

Reference Example 2: Preparation of a CuCHA Zeolite

The zeolitic material having the framework structure type CHA comprising Cu and used in the examples herein was prepared according to the teaching of U.S. Pat. No. 8,293,199 B2. Particular reference is made to Inventive Example 2 of U.S. Pat. No. 8,293,199 B2, column 15, lines 26 to 52.

Example 1: Preparation of a Catalyst Comprising One Washcoat Layer

A solution of a platinum precursor with platinum as an ammine stabilized hydroxo Pt(IV) complex (Pt content between 10 and 20 weight-%) was added dropwise into 0.25 g/in$^3$ zirconia-alumina (alumina doped with 20 weight-% zirconia, Puralox® SBa-200 Zr20, Sasol) under constant stirring, thereby performing an incipient wetness impregnation. The amount of liquids added was suitably calculated to fill the pore volume of the zirconia-alumina. The final solid content after incipient wetness was approximately 75 weight-%. The resulting mixture after incipient wetness impregnation was pre-calcined at 590° C. for four hours to remove any moisture and to fix the platinum onto the metal oxide support material giving a dry platinum content of 5 g/ft$^3$.

Separately, 0.08 g/in$^3$ (calculated as $ZrO_2$) zirconyl-acetate solution with between 29.5 and 30 weight-% solids were added to water to create a mixture with a solid content of approximately 10 weight-%. To this, 1.66 g/in$^3$ of the CuCHA zeolite prepared according to Reference Example 2 herein were added. The resulting slurry was then milled until the resulting D90 particle size determined as described in Reference Example 1 herein was between 3.5 micrometer and 6 micrometer in diameter. Subsequently, the pre-calcined Pt impregnated zirconia-alumina was made into a slurry. Firstly, tartaric acid in a ratio of five times the amount of Pt remaining after pre-calcination was added to water as was monoethanolamine in a ratio of 1/10 of the amount of tartaric acid. Secondly, the Pt impregnated zirconia-alumina was added to this solution and mixed into the solution thereby forming a slurry. The slurry was then milled until the D90 particle size determined as described in Reference Example 1 herein was between 9 micrometer and 11 micrometer in diameter. To this slurry, the direct exchanged CuCHA zeolite slurry was added and mixed, creating the final slurry that is ready for disposal. The final slurry was then disposed over the full length of honeycomb cordierite monolith substrates (10.5"×3" cylindrically shaped substrate with 300 cells per square inch and 5 mil wall thickness). Afterwards, the substrates were dried to remove between 85 and 95% of moisture and were then calcined at 450° C. The total dry gain after calcination was 2.0 g/in$^3$.

Example 2: Preparation of a Catalyst Comprising One Washcoat Layer

The procedure according to Example 1 was repeated with the exception that 0.25 g/in$^3$ titania was used instead of zirconia-alumina. The total dry gain after calcination was 2.0 g/in$^3$.

Example 3: Preparation of a Catalyst Comprising One Washcoat Layer

The procedure according to Example 1 was repeated with the exception that 1.0 g/in$^3$ instead of 0.25 g/in$^3$ zirconia-alumina (alumina doped with 20 weight-% zirconia, Puralox® SBa-200 Zr20, Sasol) was used. The total dry gain after calcination was 2.75 g/in$^3$.

Example 4: Preparation of a Catalyst Comprising Two Washcoat Layers

For the first layer (bottom layer), 0.08 g/in$^3$ zirconyl-acetate solution with between 29.5 and 30 weight-% solids were added to water to create a mixture with a solid content of approximately 10 weight-%. To this, 1.66 g/in$^3$ of the CuCHA zeolite prepared according to Reference Example 2 herein were added. The resulting slurry was then milled until the resulting D90 particle size determined as described in Reference Example 1 herein was between 9 micrometer and 12 micrometer in diameter. The slurry was then disposed over the full length of honeycomb cordierite monolith substrates (10.5"×3" cylindrically shaped substrate with 300 cells per square inch and 5 mil wall thickness). Afterwards, the substrates were dried to remove between 85 and 95% of moisture and were then calcined at 450° C. The total dry gain of the first layer after calcination was 1.75 g/in$^3$.

For the second layer (top layer), a solution of a platinum precursor with platinum as an ammine stabilized hydroxo Pt(IV) complex was diluted by 20% and then added drop wise into 0.5 g/in$^3$ silica-alumina (alumina doped with 1.5 weight-% silica, Siralox® 1.5/100, Sasol) under constant stirring, thereby performing an incipient wetness impregnation. The amount of liquids added was suitably calculated to fill the pore volume of the silica-alumina. To this incipient wetness impregnation mixture, acetic acid in the amount of 9 weight-% of the intended total dry gain of the top coat and additional water was added. The final solid content after incipient wetness impregnation was approximately 70 weight-%. Water was then added to the mixture along with n-octanol based on 0.2% of the intended dry gain of the top coat. The solid content after this step was between 43 and 47 weight-%. The slurry was then milled until the D90 particle size determined as described in Reference Example 1 herein was between 6 micrometer and 9 micrometer in diameter. The slurry was then disposed from the rear end of the honeycomb monolith substrate to 50% of the length of the substrate to form the top layer giving a dry platinum content of 10 g/ft$^3$ for the corresponding layer (corresponding to a Pt content of 5 g/ft$^3$ relative to the substrate in total). The substrate was then dried to remove 85 to 95% of the moisture and was then calcined at 450° C. The total dry gain of the second layer after calcination was 0.51 g/in$^3$.

Example 5: Preparation of a Catalyst Comprising Three Washcoat Layers

For the Pt-based second layer (bottom layer), a solution of a platinum precursor with platinum as an ammine stabilized hydroxo Pt(IV) complex was diluted by 20% and then added drop wise into 1.0 g/in$^3$ silica-alumina (alumina doped with 1.5 weight-% silica, Siralox® 1.5/100, Sasol) under constant stirring, thereby performing an incipient wetness impregnation. The amount of liquids added was suitably calculated to fill the pore volume of the silica-alumina. To this incipient wetness impregnation mixture, acetic acid in the amount of 9 weight-% of the intended total dry gain of the second layer and additional water was added. The final solid content after incipient wetness was approximately 70 weight-%. Water was then added to the mixture along with n-octanol based on 0.2% of the intended dry gain of the second layer. The solid content after this step was between 43 and 47 weight-%. The slurry was then milled until the D90 particle size determined as described in Reference Example 1 was between 6 micrometer and 9 micrometer in diameter. The Pt-containing second layer slurry was then disposed from the rear end of a honeycomb cordierite monolith substrates (10.5"×3" cylindrically shaped substrate with 300 cells per square inch and 5 mil wall thickness) to 50% of the length of the substrate giving a dry platinum content of 10 g/ft$^3$ for the corresponding layer (corresponding to a Pt content of 5 g/ft$^3$ relative to the substrate in total). The substrate was then dried to remove 85 to 95% of the moisture and then calcined at 450° C.

Afterwards, a zeolite slurry was produced. Zirconylacetate solution with between 29.5 and 30 weight-% solids (quantity calculated as 1/20 of the zeolite amount (dry/dry basis)) was added to water to create a mixture with a solid content of approximately 10 weight-%. To this, 1.66 g/in$^3$ of the CuCHA zeolite prepared according to Reference Example 2 herein were added. The resulting slurry was then milled until the D90 particle size determined as described in Reference Example 1 was between 9 micrometer and 12 micrometer in diameter. To form the first layer, the zeolite slurry was disposed on 50% of the length of the honeycomb cordierite monolith substrates, on which the second layer was already disposed, from the front end of the substrate. The dry gain of the first layer was 1.75 g/in$^3$. Afterwards, the substrates were dried to remove between 85 and 95% of moisture and were then calcined at 450° C.

Lastly, the zeolite slurry was again used to coat the third layer (outer top coat). The slurry was disposed on a length of 50% of the length of the honeycomb monolith substrates from the rear end of the substrate. The dry gain of the third layer was 0.5 g/in$^3$. Afterwards, the substrates were dried to remove 85 to 95% of the moisture and then calcined at 450° C.

The total dry gain after calcination was 1.01 g/in$^3$.

Example 6: Preparation of a Catalyst Comprising One Washcoat Layer

The procedure according to Example 1 was repeated with the exception that 0.5 g/in$^3$ instead of 0.25 g/in$^3$ zirconia-alumina zirconia-alumina was used. The total dry gain after calcination was 2.25 g/in$^3$.

Example 7: Preparation of a Catalyst Comprising Two Washcoat Layers

For the first layer (bottom layer), a solution of a platinum precursor with platinum as an ammine stabilized hydroxo Pt(IV) complex was diluted by 20% and then added drop wise into 0.5 g/in$^3$ silica-alumina (alumina doped with 1.5 weight-% silica, Siralox® 1.5/100, Sasol) under constant stirring, thereby performing an incipient wetness impregnation. The amount of liquids added was suitably calculated to fill the pore volume of the silica-alumina. To this incipient wetness impregnation mixture, acetic acid in the amount of 9 weight-% of the intended total dry gain of the bottom coat and additional water was added. The final solid content after incipient wetness impregnation was approximately 70 weight-%. Water was then added to the mixture along with n-octanol based on 0.2% of the intended dry gain of the bottom coat. The solid content after this step was between 43 and 47 weight-%. The slurry was then milled until the D90 particle size determined as described in Reference Example 1 herein was between 6 micrometer and 9 micrometer in diameter. The slurry was then disposed from the rear end of the honeycomb monolith substrate (10.5"×3" cylindrically shaped substrate with 300 cells per square inch and 5 mil wall thickness) to 100% of the length of the substrate to form the bottom layer giving a dry platinum content of 16 g/ft$^3$ for the corresponding layer (corresponding to a Pt content of 8 g/ft$^3$ relative to the substrate in total). The substrate was then dried to remove 85 to 95% of the moisture and was then calcined at 450° C. The total dry gain of the first layer after calcination was 0.51 g/in$^3$.

For the second layer (top layer), 0.17 g/in$^3$ zirconyl-acetate solution with between 29.5 and 30 weight-% solids were added to water to create a mixture with a solid content of approximately 10 weight-%. To this, 3.33 g/in$^3$ of the CuCHA zeolite prepared according to Reference Example 2 herein were added. The resulting slurry was then milled until the resulting D90 particle size determined as described in Reference Example 1 herein was between 9 micrometer and 12 micrometer in diameter. The slurry was then disposed over the full length (i.e. 100% of the length of the substrate) of honeycomb cordierite monolith substrates. Afterwards, the substrates were dried to remove between 85 and 95% of moisture and were then calcined at 450° C. The total dry gain of the second layer after calcination was 3.5 g/in$^3$.

The total dry gain of the final product was 4.0 g/in$^3$.

Example 8: Preparation of a Catalyst Comprising One Washcoat Layer

A solution of a platinum precursor with platinum as an ammine stabilized hydroxo Pt(IV) complex (Pt content between 10 and 20 weight-%, produced internally by BASF) was added dropwise into 0.25 g/in$^3$ zirconia-alumina (alumina doped with 20 weight-% zirconia, Puralox® SBa-200 Zr20, Sasol) under constant stirring, thereby performing an incipient wetness impregnation. The amount of liquids added was suitably calculated to fill the pore volume of the zirconia-alumina. The final solid content after incipient wetness was approximately 75 weight-%. The resulting mixture after incipient wetness impregnation was pre-calcined at 590° C. for four hours to remove any moisture and to fix the platinum onto the metal oxide support material giving a dry platinum content of 8 g/ft$^3$. Separately, 0.08 g/in$^3$ (calculated as $ZrO_2$) zirconyl-acetate solution with between 29.5 and 30 weight-% solids were added to water to create a mixture with a solid content of approximately 10 weight-%. To this, 3.33 g/in$^3$ of the CuCHA zeolite prepared according to Reference Example 2 herein were added. The resulting slurry was then milled until the resulting D90 particle size determined as described in Reference Example 1 herein was between 3.5 micrometer and 6 micrometer in diameter. Subsequently, the pre-calcined Pt impregnated zirconia-alumina was made into a slurry. Firstly, tartaric acid in a ratio of five times the amount of Pt remaining after pre-calcination was added to water as was monoethanolamine in a ratio of 1/10 of the amount of tartaric acid. Secondly, the Pt impregnated zirconia-alumina was added to this solution and mixed into the solution creating a slurry. The slurry was then milled until the D90 particle size determined as described in Reference Example 1 herein was between 9 micrometer and 11 micrometer in diameter. To this slurry, the direct exchanged CuCHA zeolite slurry was added and mixed, creating the final slurry that is ready for disposal. The final slurry was then disposed over the full length of honeycomb cordierite monolith substrates (10.5"× 3" cylindrically shaped substrate with 400 cells per square inch and 4 mil wall thickness). Afterwards, the substrates were dried to remove between 85 and 95% of moisture and were then calcined at 450° C. The total dry gain after calcination was 3.75 g/in$^3$.

Example 9: Use of the Catalysts of Examples 1 to 6—$NO_2$ Make

The catalysts were tested in a Diesel System Simulator capable of emulating the transients experienced by a catalyst downstream of a combustion engine. The tests were carried out under steady-state condition. The dimensions of the cores were 1"(diameter)×3" (length). All gas composition measurements were carried out on a FTIR spectrometer. The tests for measuring the $NO_2$ make were carried out under $NO_x$ only conditions, this means that no ammonia was added. The catalysts of Examples 1 to 6 were tested using a gas characterized by the contents as shown below. The space velocity for each test run was set at 100,000 h$^{-1}$. According to the present invention the space velocity is understood as the number of volumes of exhaust gas equal to the volume of the coated catalyst that are passed through it every hour. The space velocity is a means to eliminate any influences of the catalyst size when making performance comparisons. The space velocity is calculated by the gas volumetric flow [m$^3$/h] per catalyst volume [m$^3$] and is accordingly expressed in the unit [1/h]. Thus, the NO$_2$/NO$_x$ ratio was determined relative to the temperature of the gas, whereby the amount of NO$_x$ equals the sum of the amounts of NO and NO$_2$. The resulting curve represents the light-off curve. The light-off curve was measured between 150 and 450° C. for each of the catalysts of Examples 1 to 6, whereby a ramp rate (for both ramp up and ramp down) of 10 K/min was set. At first, the light-off curve was measured when heating up (ramp up). Then, the temperature was held at 450° C. for 10 min. After that, the light-off curve was measured when cooling down (ramp down).

TABLE 1

Characteristics of the used gas

| Hydrocarbons [ppm] | CO [ppm] | NO [ppm] | O$_2$ [%] | H$_2$O [%] | CO$_2$ [%] |
|---|---|---|---|---|---|
| 31 | 9 | 631 | 10 | 8 | 8 |

The results for the light-off are shown in FIGS. 1 and 2, samples 1 to 6 refer to Examples 1 to 6, respectively. FIG. 1 shows the light-off curve for ramp up. As can be taken from FIG. 1, it has been found that the catalyst of Example 1 according to the present invention (see sample 1) shows the highest NO$_2$/NO$_x$ ratio in the temperature range of from 250 to 425° C. and the catalyst of Example 4 (see sample 4) in the temperature range of from 175 to 215° C. FIG. 2 shows the light-off curve for ramp down, samples 1 to 6 refer to Examples 1 to 6, respectively. As can be taken from FIG. 2, the catalyst of Example 4 (see sample 4) shows the highest NO$_2$/NO$_x$ ratio in the temperature range of from 290 to 450° C., the catalyst of Example 5 (see sample 5) in the temperature range of from 240 to 265° C. and the catalyst of Example 1 (see sample 1) below 230° C.

Example 10: Use of the Catalysts of Examples 1 to 6—Ammonia Oxidation, N$_2$O Make, and NO$_x$ Make In order to determine the ammonia oxidation efficiency, the N$_2$O make and the NO$_x$ make of the catalysts of Examples 1 to 6, the ammonia slip, the N$_2$O make, and the NO$_x$ make, respectively, were measured at steady state points. Eight steady state points have been chosen to balance temperature range and test expediency. The temperature range of 200 to 450° C. is considered most relevant for heavy duty diesel operations. The concentrations of the gases were considered to represent potential concentrations to be encountered by an AMOx in operation. NO$_x$ would typically contain only NO and much less than engine-out due to the effect of an SCR catalyst located upstream. If running at over-dosing conditions (i.e. more reductant is in the gas stream than NO$_x$), there would be an excess of NH$_3$ entering the AMOx compared to NO$_x$. The O$_2$ and H$_2$O concentrations are considered to be consistent with typical diesel engine operations. Also, the given space velocity was considered to fit to a typical Euro VI AMOx volume. The characteristics of the eight steady state points are shown in table 1 below. The space velocity was set at 120,000 h$^{-1}$.

TABLE 2

Characteristics of the steady state points measurements

| Steady state point | Duration [min] | Temperature [° C.] | NH$_3$ conc. [ppm] | NO conc. [ppm] | O$_2$ conc. [vol-%] | H$_2$O conc. [vol-%] |
|---|---|---|---|---|---|---|
| — | 5 | 450 | 0 | 0 | 10 | 5 |
| 1 | 15 | 450 | 150 | 50 | 10 | 5 |
| 2 | 15 | 400 | 150 | 50 | 10 | 5 |
| 3 | 15 | 350 | 150 | 50 | 10 | 5 |
| 4 | 15 | 325 | 150 | 50 | 10 | 5 |
| 5 | 15 | 300 | 150 | 50 | 10 | 5 |
| 6 | 20 | 275 | 150 | 50 | 10 | 5 |
| 7 | 30 | 250 | 150 | 50 | 10 | 5 |
| 8 | 30 | 200 | 150 | 50 | 10 | 5 |

Ammonia Oxidation

The results of the ammonia slip measurements are displayed in FIG. 3, wherein samples 1 to 6 refer to Examples 1 to 6, respectively. FIG. 3 shows the ammonia slip relative to every single steady state point. Thus, it has been found out that the catalyst of Example 1 (see sample 1) displays the lowest ammonia slip of all Examples for each steady state point.

N$_2$O Make

The results of the N$_2$O make measurements are displayed in FIG. 4, wherein samples 1 to 6 refer to Examples 1 to 6, respectively. FIG. 4 shows the N$_2$O make relative to every single steady state point. Surprisingly, the catalyst of Example 2 (see sample 2) displays the lowest N$_2$O selectivity of all catalysts on average, in particular said catalyst displays the lowest N$_2$O make at steady state points 2 to 7. At steady state point 8, the catalyst of Example 1 (see sample 1) shows the lowest N$_2$O make.

NO$_x$ Make

The results of the NO$_x$ make are displayed in FIG. 5, wherein samples 1 to 6 refer to Examples 1 to 6, respectively. FIG. 5 shows the NO$_x$ make relative to every single steady state point. Thus, it has surprisingly been found out that the catalyst of Example 2 (see sample 2) displays the lowest NO$_x$ make at steady state points 1 to 6, whereas the catalyst of Example 1 (see sample 1) displays the lowest NO$_x$ make at steady state points 7 and 8.

Example 11: Use of the Catalysts of Examples 1 to 6—DeNO$_x$ Performance, NO$_x$ Slip, NH$_3$ Slip, NO$_2$ Make For measuring the DeNO$_x$ performance, the NO$_x$ slip, the ammonia slip and the NO$_2$ make, the relative amount of reduced NO$_x$ was determined at five different steady state points. Similar to the AMOx test, the five steady state points were chosen to balance the most relevant temperatures for SCR with test expediency. Between 250 and 400° C., nearly all SCR catalysts are very active such that measurements at these temperatures would not give as much information.

From 175° C. to 250° C., the NO-only activity of an SCR catalyst is greatly stressed while above 400° C., the extent of NH$_3$ oxidation can be observed, though this reaction becomes more noticeable at higher temperatures (i.e. higher than 400° C.). However, temperatures higher than 400° C. are rarely encountered in typical operation. It is considered that the NH$_3$ adsorption capacity of the catalyst is much higher at lower temperatures and that it takes therefore longer to equilibrate and reach maximum conversion. Accordingly, the lower temperatures are held for much longer than higher temperatures. As far as the gas composition concerns, these are values that can represent European motor calibrations with overdosing. (It is noted that the NO concentration here is much higher than for the AMOx test as this is a test for SCR conversion, not for oxidation of NO or $NH_3$.)

The temperature and duration for each steady state point is given in Table 3 below as well as the characteristics of the used gas. The space velocity was set at 62,000 $h^{-1}$.

TABLE 3

Characteristics of the $DeNO_x$ measurements

| Steady state point | Duration [min] | Temperature [° C.] | $NH_3$ conc. [ppm] | NO conc. [ppm] | $O_2$ conc. [vol-%] | $H_2O$ conc. [vol-%] | $CO_2$ conc. [vol-%] |
|---|---|---|---|---|---|---|---|
| 1 | 60 | 175 | 550 | 500 | 10 | 5 | 5 |
| 2 | 60 | 200 | 550 | 500 | 10 | 5 | 5 |
| 3 | 30 | 225 | 550 | 500 | 10 | 5 | 5 |
| 4 | 20 | 250 | 550 | 500 | 10 | 5 | 5 |
| 5 | 15 | 400 | 550 | 500 | 10 | 5 | 5 |

$DeNO_x$ Performance

The results for the $DeNO_x$ performance are shown in FIG. 6, wherein samples 1 to 6 refer to Examples 1 to 6, respectively. As can be taken from FIG. 6, the catalyst of Example 1 (see sample 1) surprisingly shows the best $DeNO_x$ performance at steady state points 1, 2 and 3, whereas the catalyst of Example 4 (see sample 4) shows the best $DeNO_x$ performance at steady state point 4 and the catalyst of Example 5 (see sample 5) at steady state point 5.

$NO_x$ Slip

Further, the $NO_x$ slip has been determined. The results of the respective measurements are displayed in FIG. 7, wherein samples 1 to 6 refer to Examples 1 to 6, respectively. FIG. 7 shows the $NO_x$ slip relative to every single steady state point. As can be seen in FIG. 7, the catalyst of Example 1 (see sample 1) displays the lowest $NO_x$ slip at steady state points 1, 2 and 3, whereas the catalyst of Example 4 (see sample 4) displays the lowest $NO_x$ slip at steady state point 4 and the catalyst of Example 5 (see sample 5) at steady state point 5.

Ammonia Slip

In addition to that, the ammonia slip has been determined. The results are displayed in FIG. 8, wherein samples 1 to 6 refer to Examples 1 to 6, respectively. FIG. 8 shows the ammonia slip relative to every single steady state point. Therein, it can be seen that the catalyst of Example 1 (see sample 1) shows the lowest ammonia slip at steady state points 1 to 4, whereas the ammonia slip at steady state point 5 is almost similar for all catalysts. It was figured out that the catalyst of Example 1 (see sample 1) oxidizes about 22 ppm ammonia at 220° C., about 55 ppm at 225° C. and about 90 ppm at 250° C. In comparison to that, the catalyst of Example 5 (see sample 5) oxidizes about 22 ppm ammonia at 200° C., about 30 ppm at 225° C. and 65 ppm at 250° C.

$NO_2$ Make

Further, the $NO_2$ make has been determined. The results of the respective measurements are displayed in FIG. 9, wherein samples 1 to 6 refer to Examples 1 to 6, respectively. FIG. 9 shows the $NO_2$ make relative to every single steady state point. It can be seen that the $NO_2$ levels are generally very low. Further, it can be seen that the catalyst of Example 1 (see sample 1) shows the highest $NO_2$ make at steady state points 4 and 5, whereas the $NO_2$ make at steady state points 1 to 3 are almost similar for all catalysts.

Example 12: Use of the Catalyst of Examples 7 and 8 for Influencing the $NO_2$ to $NO_x$ Ratio The catalysts of Examples 7 and 8 were tested on a EU VI non-EGR 13L diesel combustion engine on a test cell. The tests were carried out under steady-state condition. A urea doser was located downstream of the engine followed by the exhaust gas aftertreatment in a cone piping set-up. Seven steady state points have been chosen to balance temperature range and test expediency. The characteristics of the seven steady state points which are designated as Loadpoints (LP1 to LP7) are shown in table 4 below.

TABLE 4

Characteristics of the seven steady state points measurements

| Loadpoint | Exhaust mass flow [kg/h] | $NO_x$ levels [ppm] | Temperature [° C.] |
|---|---|---|---|
| LP1 | 1960 | 690 | 467 |
| LP2 | 1090 | 1092 | 450 |
| LP3 | 1062 | 551 | 350 |
| LP4 | 1078 | 225 | 240 |
| LP5 | 600 | 664 | 367 |
| LP6 | 591 | 429 | 250 |
| LP7 | 591 | 392 | 217 |

All gas composition measurements were carried out on a FTIR spectrometer. The tests for evaluating the $NO_2$ to $NO_x$ ratio were carried out under two different conditions with respect to the ammonia to nitrogen ratio (NSR) being (1) a NSR of 0 and (2) a NSR of 0.5.

Thus, the $NO_2$ to $NO_x$ ratio was determined relative to each steady state point, whereby the amount of $NO_x$ equals the sum of the amounts of NO and $NO_2$. The results of the measurements are shown in FIGS. 10 and 11, wherein in both Figures the "Layered AMOx design 8 $g/ft^3$" refers to Example 7 and the "Mixed AMOx design 8 $g/ft^3$" refers to Example 8. It can be taken from FIG. 10 that the catalyst of Example 8 ("Mixed AMOx 8 $g/in^3$") shows a higher $NO_2$ to $NO_x$ ratio for steady state points LP1, LP2, LP3, LP5, LP6 and LP7 compared to Example 7 ("Layered AMOx 8 $g/in^3$") when applying an ammonia to nitrogen ratio (NSR) of 0. At steady state point LP4, the catalyst of Example 7 shows a higher $NO_2$ to $NO_x$ ratio. Further, it can be taken from FIG. 11 that the catalyst of Example 8 shows a higher $NO_2$ to $NO_x$ ratio for steady state points LP1, LP2, LP3, LP5, LP6 and LP7 compared to Example 7 ("Layered AMOx 8 $g/in^3$") when applying an ammonia to nitrogen ratio (NSR) of 0.5.

CITED LITERATURE

Figure 1:
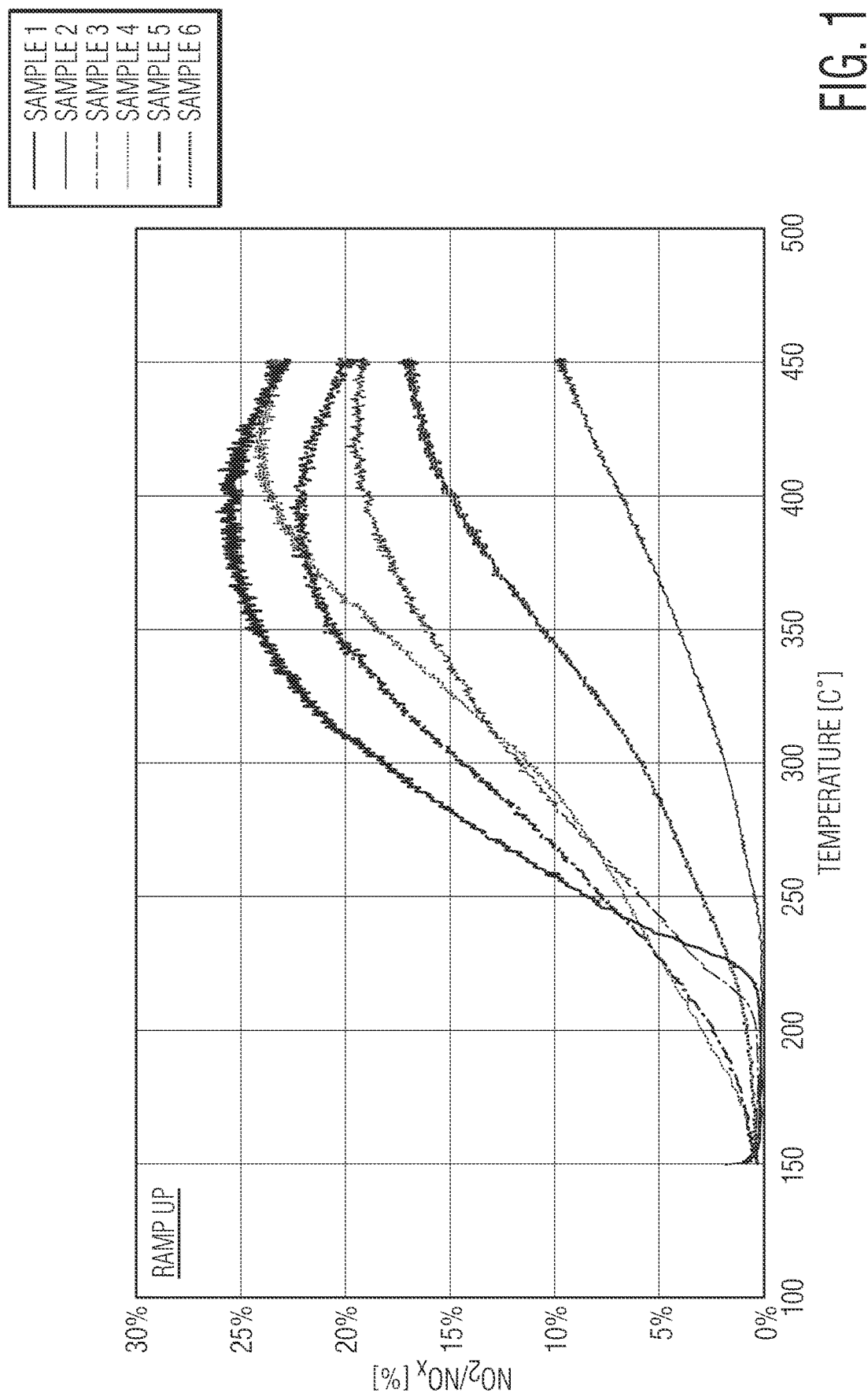
FIG. 1: shows the light-off curve of samples 1 to 6 when heating the sample up (light-off curve for ramp up). The samples 1 to 6 refer to the catalysts of Examples 1 to 6, respectively. In the figure, the temperature is shown along the abscissa and the $NO_2/NO_x$ ratio is shown along the ordinate.
Figure 2:
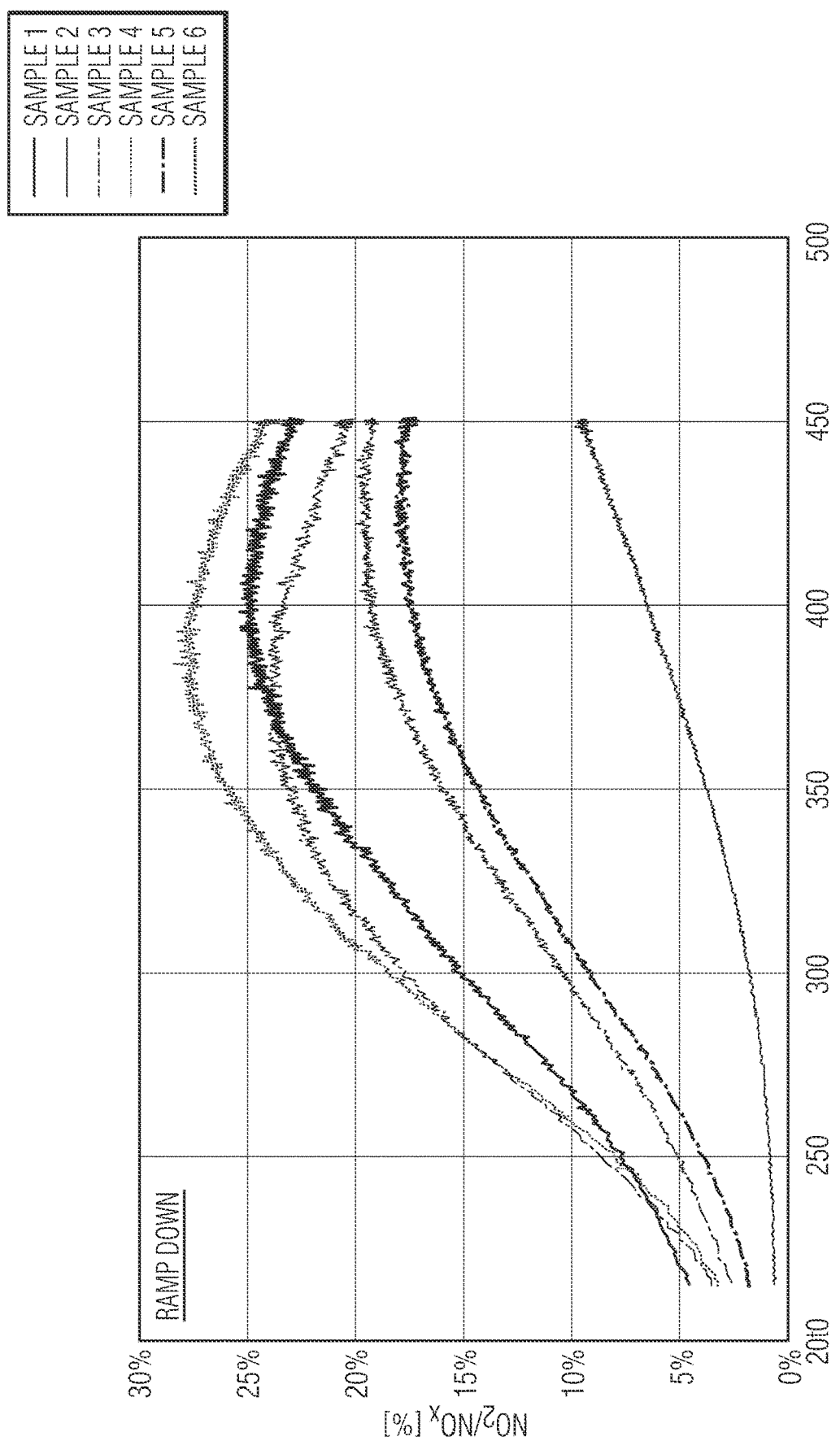
FIG. 2: shows the light-off curve of samples 1 to 6 when cooling the sample down (light-off curve for ramp down). The samples 1 to 6 refer to the catalysts of Examples 1 to 6, respectively. In the figure, the temperature is shown along the abscissa and the $NO_2/NO_x$ ratio is shown along the ordinate.
Figure 3:
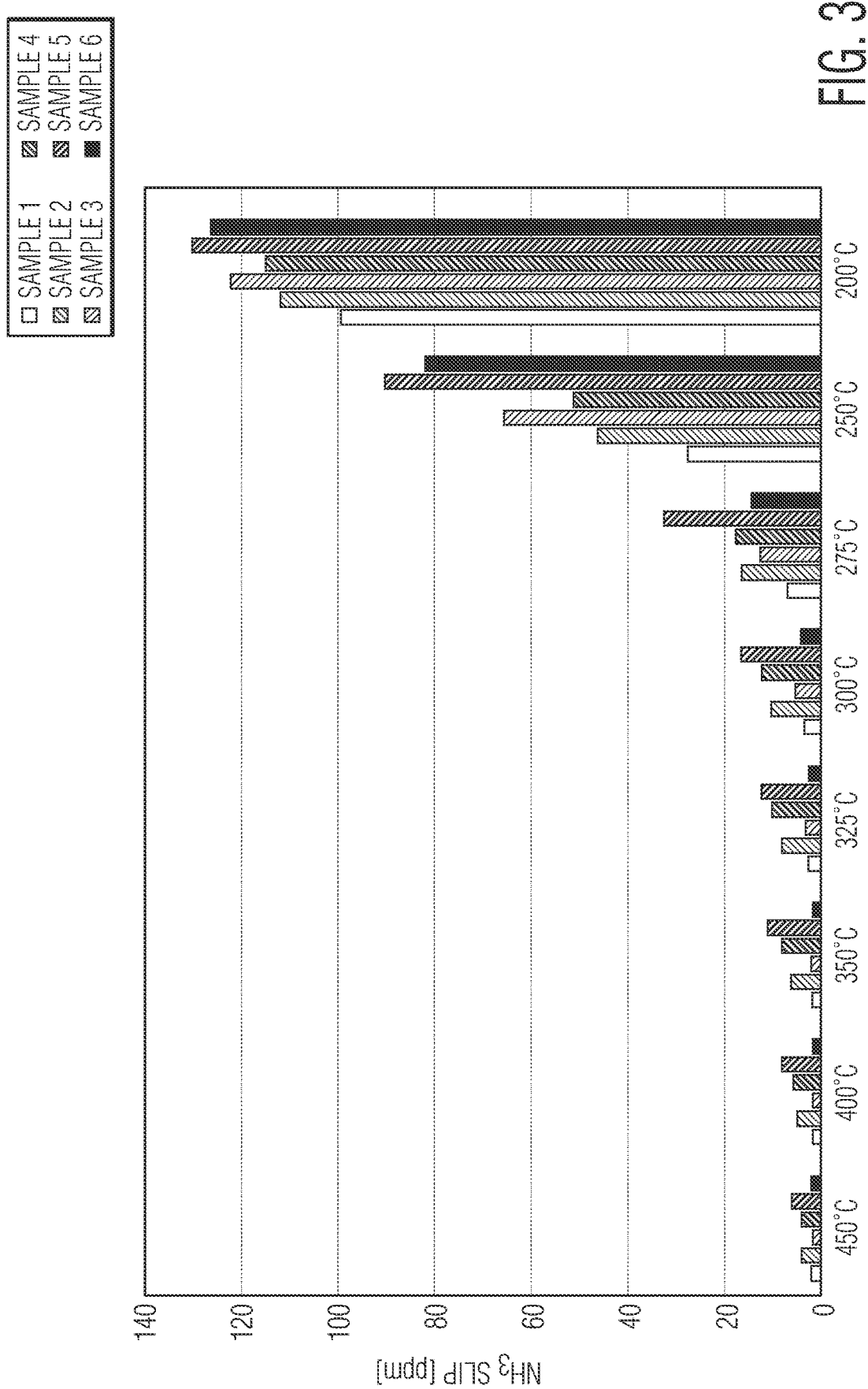
FIG. 3: shows the ammonia slip of samples 1 to 6 for each of the eight steady state points. The samples 1 to 6 refer to the catalysts of Examples 1 to 6, respectively. In the figure, the ammonia slip is shown on the ordinate relative to each of the eight steady state points for samples 1 to 6 shown on the abscissa.
Figure 4:
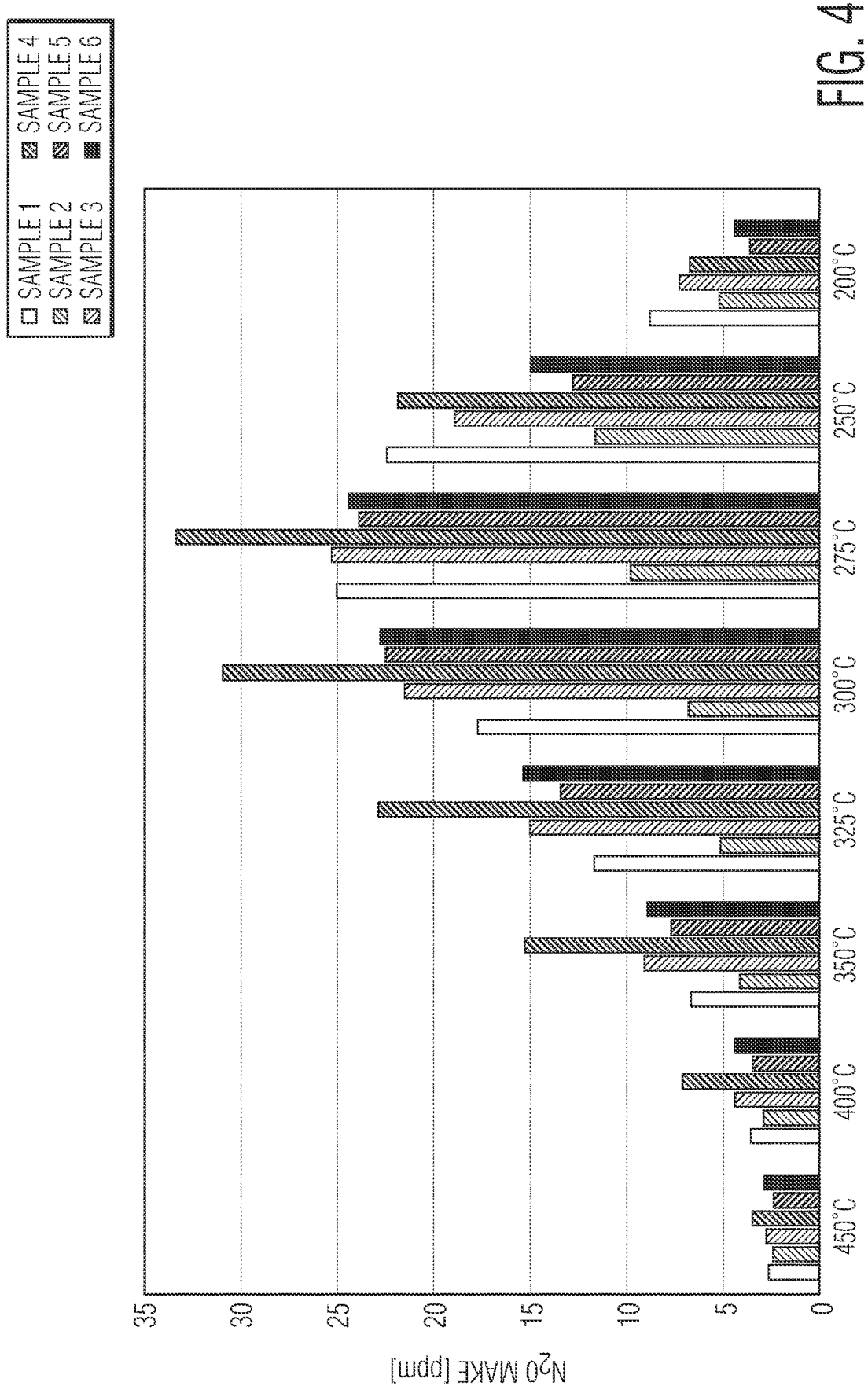
FIG. 4: shows the $N_2O$ make of samples 1 to 6 for each of the eight steady state points. The samples 1 to 6 refer to the catalysts of Examples 1 to 6, respectively. In the figure, the $N_2O$ make is shown on the ordinate relative to each of the eight steady state points for samples 1 to 6 shown on the abscissa.
Figure 5:
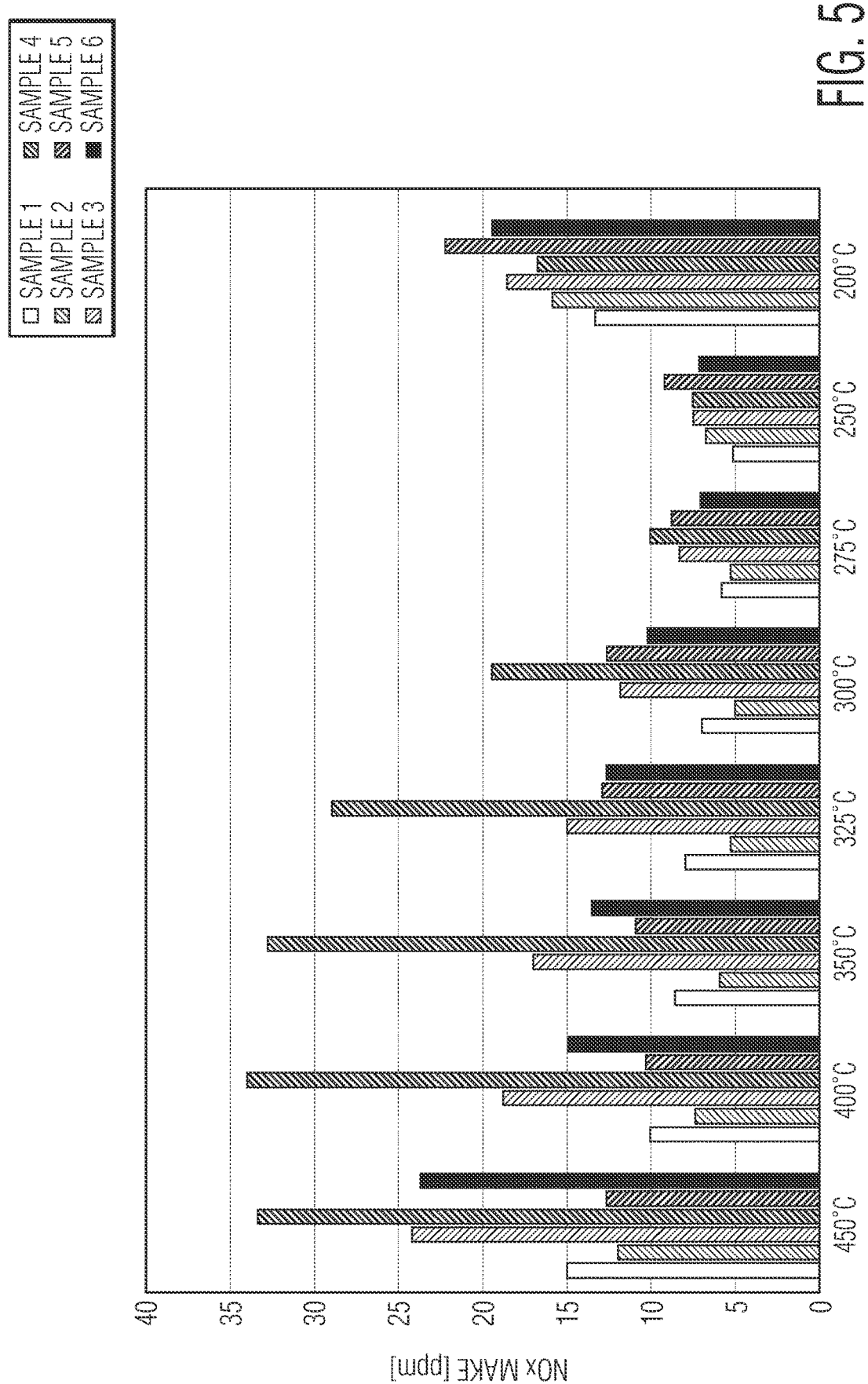
FIG. 5: shows the $NO_x$ make for samples 1 to 6 for each of the eight steady state points. The samples 1 to 6 refer to the catalysts of Examples 1 to 6, respectively. In the figure, the $NO_x$ make is shown on the ordinate relative to each of the eight steady state points for samples 1 to 6 shown on the abscissa.
Figure 6:
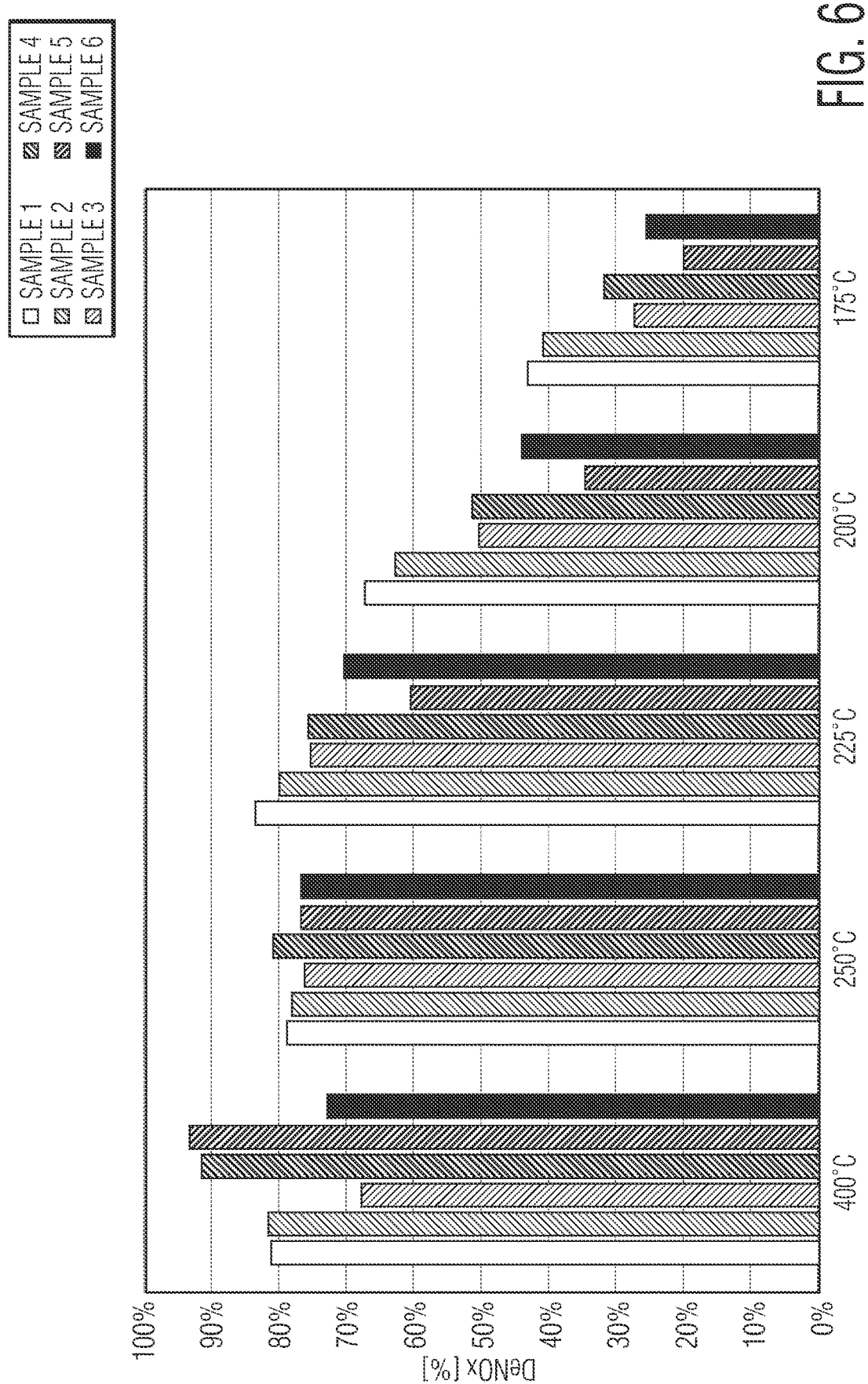
FIG. 6: shows the $DeNO_x$ performance of samples 1 to 6 for each of the five steady state points. The samples 1 to 6 refer to the catalysts of Examples 1 to 6, respectively. In the figure, the relative amount of reduced $NO_x$ is shown on the ordinate relative to each of the five steady state points for samples 1 to 6 shown on the abscissa.
Figure 7:
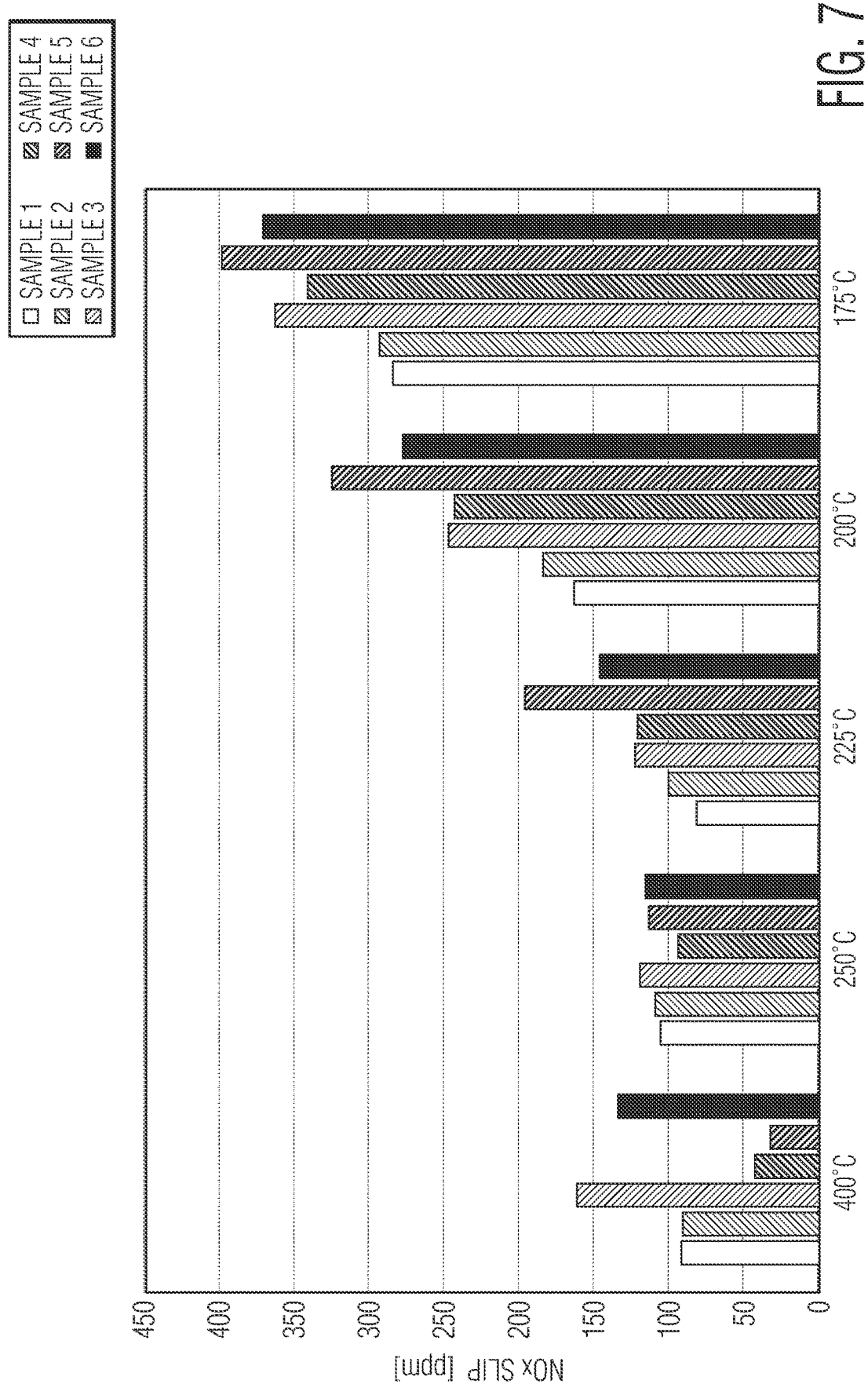
FIG. 7: shows the $NO_x$ slip of samples 1 to 6 for each of the five steady state points. The samples 1 to 6 refer to the catalysts of Examples 1 to 6, respectively. In the figure, the $NO_x$ slip is shown on the ordinate relative to each of the five steady state points for samples 1 to 6 shown on the abscissa.
Figure 8:
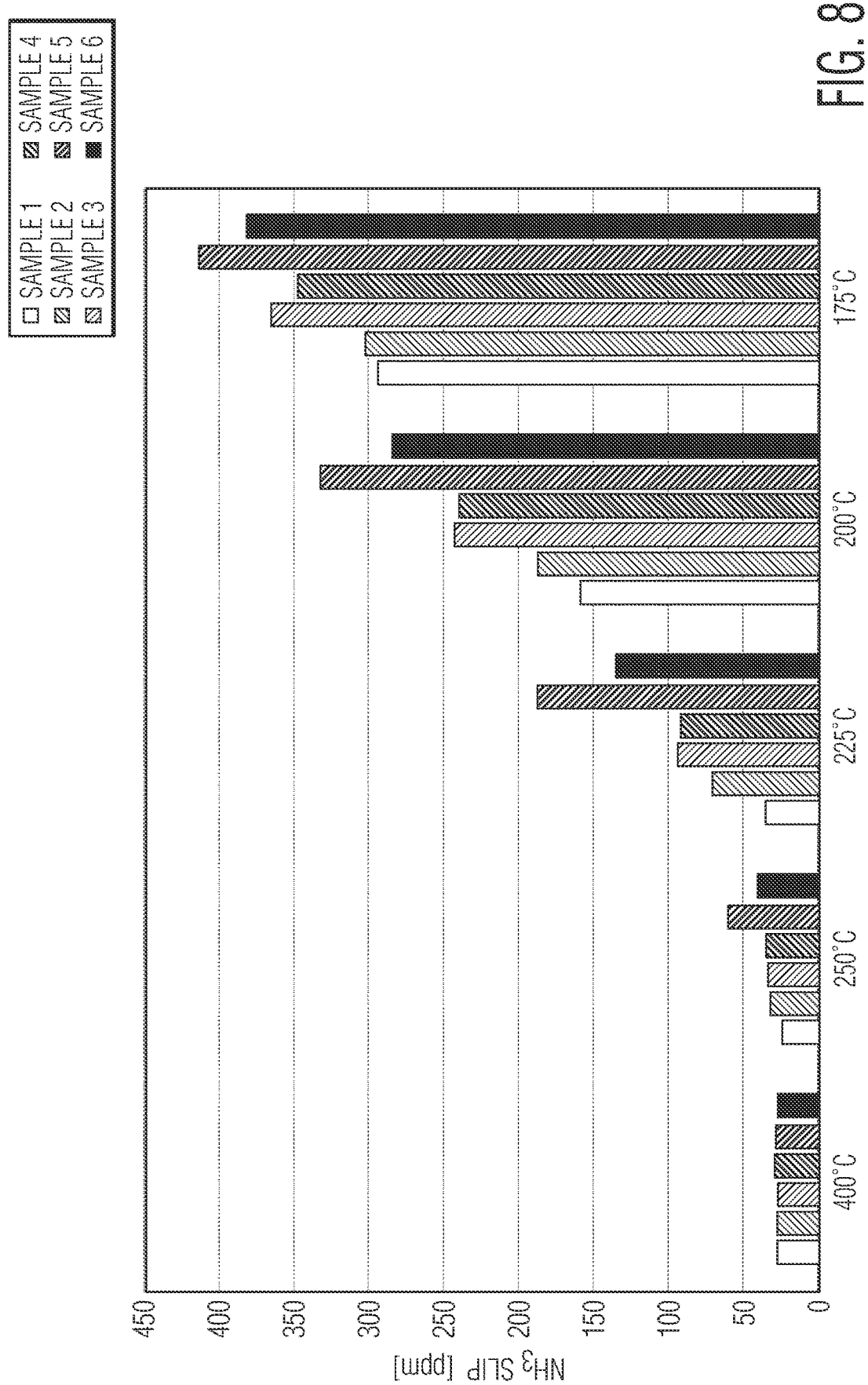
FIG. 8: shows the ammonia slip of samples 1 to 6 for each of the five steady state points. The samples 1 to 6 refer to the catalysts of Examples 1 to 6, respectively. In the figure, the ammonia slip is shown on the ordinate relative to each of the five steady state points for samples 1 to 6 shown on the abscissa.
Figure 9:
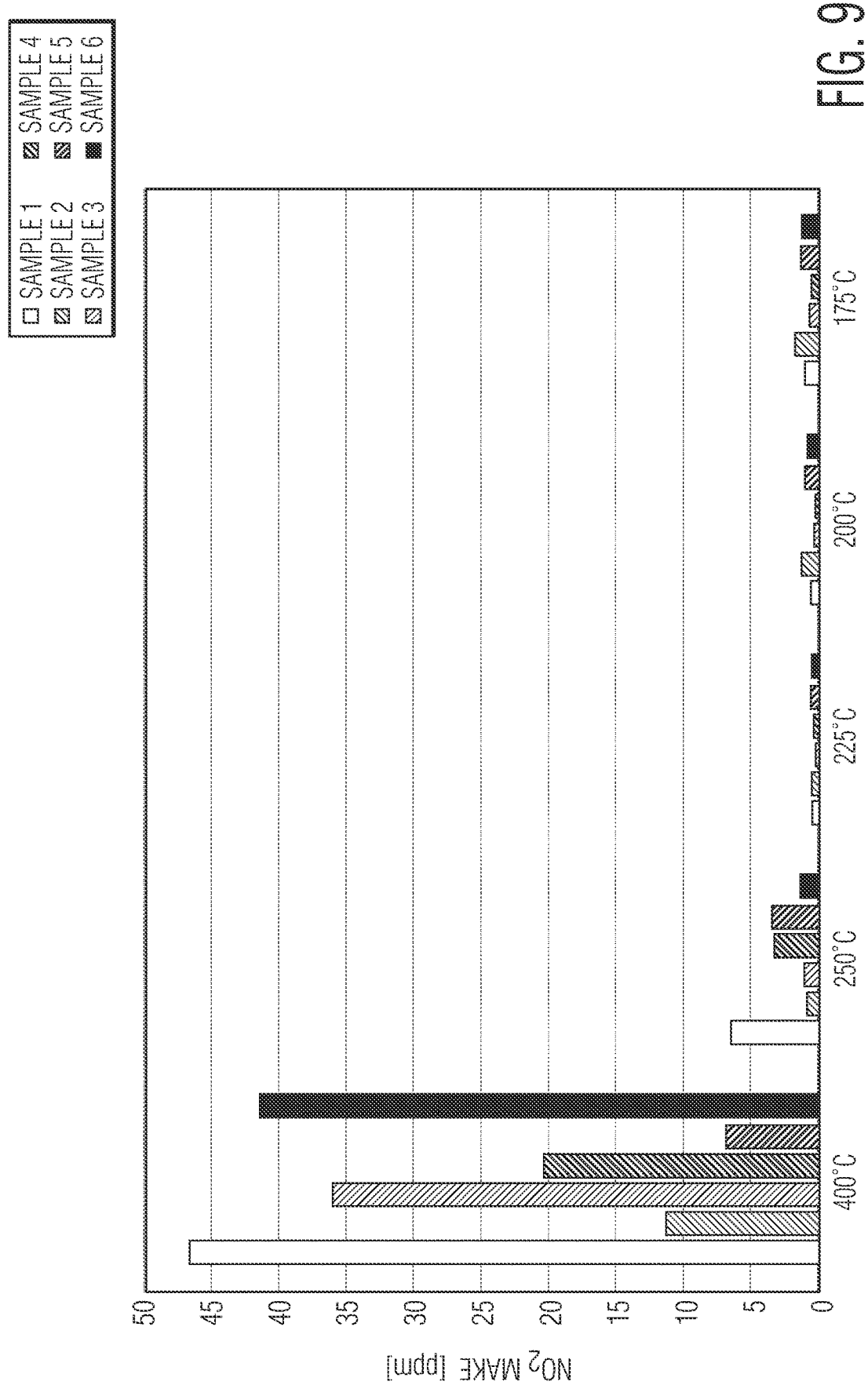
FIG. 9: shows the $NO_2$ make of samples 1 to 6 for each of the five steady state points. The samples 1 to 6 refer to the catalysts of Examples 1 to 6, respectively. In the figure, the $NO_2$ make is shown on the ordinate relative to each of the five steady state points for samples 1 to 6 shown on the abscissa.
Figure 10:
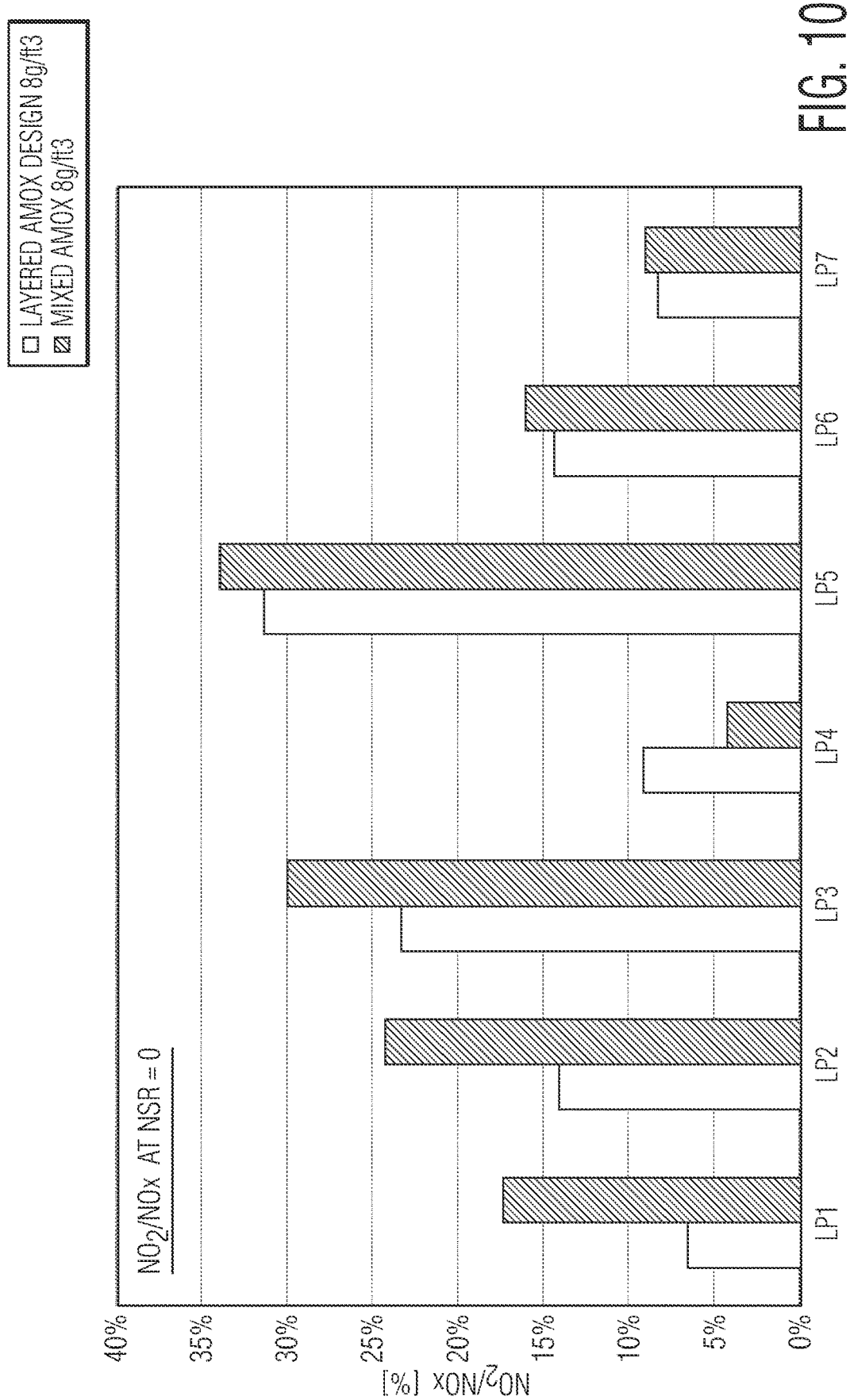
FIG. 10: shows the $NO_2/NO_x$ ratio at an ammonia to nitrogen ratio (normalized stoichiometric ratio=NSR) of 0 for the "Layered AMOx design 8 g/ft$^3$" and for the "Mixed AMOx design 8 g/ft$^3$" for each of the seven steady state points. The "Layered AMOx design 8 g/ft$^3$" refers to Example 7 and the "Mixed AMOx design 8 g/ft$^3$" refers to Example 8. In the figure, the ratio of $NO_2/NO_x$ is shown on the ordinate relative to each of the seven steady state points for the "Layered AMOx design 8 g/ft$^3$" and for the "Mixed AMOx design 8 g/ft$^3$" shown on the abscissa.
Figure 11:
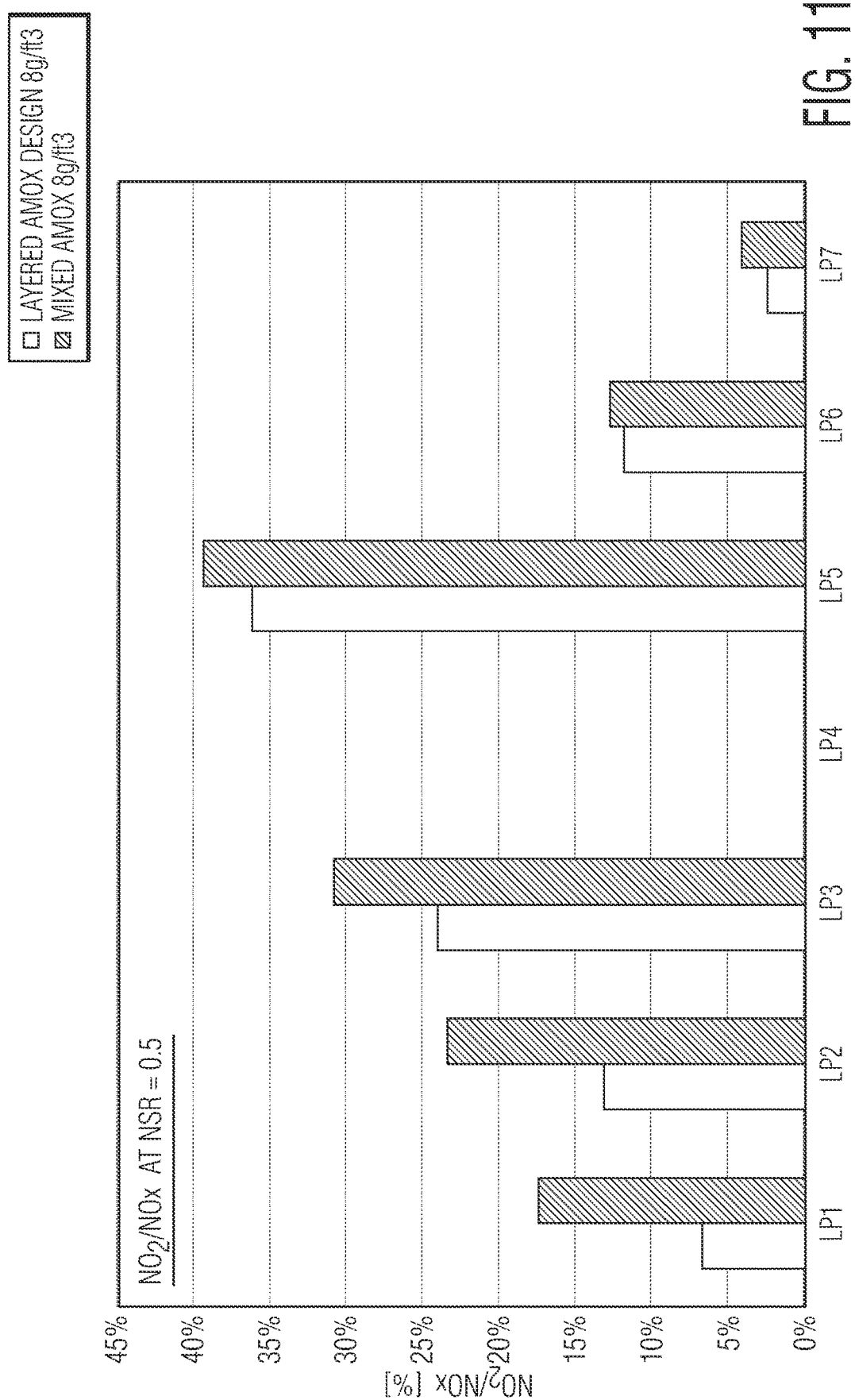
FIG. 11: shows the $NO_2/NO_x$ ratio at an ammonia to nitrogen ratio (NSR) of 0.5 for the "Layered AMOx design 8 g/ft$^3$" and for the "Mixed AMOx design 8 g/ft$^3$" for each of the seven steady state points. The "Layered AMOx design 8 g/ft$^3$" refers to Example 7 and the "Mixed AMOx design 8 g/ft$^3$" refers to Example 8. In the figure, the ratio of $NO_2/NO_x$ is shown on the ordinate relative to each of the seven steady state points for the "Layered AMOx design 8 g/ft$^3$" and for the "Mixed AMOx design 8 g/ft$^3$" shown on the abscissa.

WO 2015/189680 A1
U.S. Pat. No. 9,272,272 B2
U.S. Pat. No. 8,715,618 B2
U.S. Pat. No. 8,293,199 B2
U.S. Pat. No. 8,883,119 B2
U.S. Pat. No. 8,961,914 B2
U.S. Pat. No. 9,242,238 B2

The invention claimed is:

1. An exhaust gas treatment system in fluid communication with a heavy-duty diesel engine comprising
    a first reductant injector,
    a first catalyst for selective catalytic reduction of $NO_x$,
    a second catalyst, wherein the second catalyst is a catalyst comprising a washcoat comprising a first layer and a second layer, the washcoat being disposed on a substrate, wherein the washcoat comprises
    (i) a second layer comprising a platinum group metal supported on a metal oxide support material, and
    (ii) a first layer comprising at least one chosen from an oxidic compound V, an oxidic compound of W, and a zeolitic material comprising one or more of Cu and Fe; wherein the first layer does not comprise any platinum group metal;
    a catalyzed soot filter,
    a second reductant injector,
    a third catalyst for selective catalytic reduction of $NO_x$, and
    a fourth ammonia catalyst for selective catalytic reduction of $NO_x$ and/or for the oxidation of ammonia;
    wherein the exhaust gas treatment system contains no diesel oxidation catalyst; wherein the first catalyst is located upstream of the second catalyst, the second catalyst is located upstream of the third catalyst, and the third catalyst is located upstream of the fourth catalyst.

2. The exhaust gas treatment system of claim 1, wherein the catalyst is located up stream of the catalyzed soot filter, and wherein no diesel oxidation catalyst is located between the catalyst and the catalyzed soot filter.

3. The exhaust gas treatment system of claim 1, wherein the platinum group metal is at least one chosen from Pt, Pd and Rh.

4. The exhaust gas treatment system of claim 1, wherein the framework structure of the zeolitic material comprises a tetravalent element Y which is at least one chosen from Si, Sn, Ti, Zr, and Ge.

5. The exhaust gas treatment system of claim 1, wherein the zeolitic material has a framework structure of the type AEI, GME, BEA, CHA, FAU, FER, HEU, LEV, MEI, MEL, MFI, or MOR.

6. The exhaust gas treatment system of claim 1, wherein the substrate has a plurality of longitudinally extending passages formed by longitudinally extending walls bounding and defining the passages and a longitudinal total length extending between a front end and a rear end of the substrate.

7. The exhaust gas treatment system of claim 1, wherein the substrate has a substrate length, and wherein the one layer is disposed on 50% to 100%, of the total length of the substrate.

8. The exhaust gas treatment system of claim 1, wherein the first layer is disposed on the substrate and the second layer is at least partially disposed on the first layer, or wherein the second layer is disposed on the substrate and the first layer is at least partially disposed on the second layer.

9. The exhaust gas treatment system of claim 8, wherein the washcoat further comprises a third layer, wherein the third layer comprises one or more of an oxidic compound of V, an oxidic compound of W, and a zeolitic material comprising one or more of Cu and Fe.

10. The exhaust gas treatment system of claim 1, wherein the catalyst is located upstream of a catalyzed soot filter.

11. The exhaust gas treatment system of claim 1, wherein the first reductant injector is a urea injector.

12. The exhaust gas treatment system of claim 1, wherein the catalyst is downstream of the internal combustion engine.

\* \* \* \* \*